(12) United States Patent
Tominaga et al.

(10) Patent No.: US 10,340,744 B2
(45) Date of Patent: Jul. 2, 2019

(54) NON-CONTACT POWER SUPPLYING APPLIANCE AND NON-CONTACT POWER RECEIVING APPLIANCE, AND NON-CONTACT POWER TRANSMITTING SYSTEM PROVIDED THEREWITH

(71) Applicant: Panasonic Intellectual Property Management Co., Ltd., Osaka (JP)

(72) Inventors: Hiroshi Tominaga, Hyogo (JP); Akio Kurobe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 15/503,042

(22) PCT Filed: May 12, 2016

(86) PCT No.: PCT/JP2016/002324
§ 371 (c)(1),
(2) Date: Feb. 10, 2017

(87) PCT Pub. No.: WO2016/185693
PCT Pub. Date: Nov. 24, 2016

(65) Prior Publication Data
US 2017/0229922 A1    Aug. 10, 2017

(30) Foreign Application Priority Data
May 19, 2015   (JP) .................................. 2015-101858

(51) Int. Cl.
*H02J 50/40*     (2016.01)
*H02J 50/90*     (2016.01)
(Continued)

(52) U.S. Cl.
CPC ............ *H02J 50/12* (2016.02); *H02J 7/0013* (2013.01); *H02J 7/025* (2013.01); *H02J 50/40* (2016.02);
(Continued)

(58) Field of Classification Search
None
See application file for complete search history.

(56) References Cited

U.S. PATENT DOCUMENTS

| 2005/0127869 A1* | 6/2005 | Calhoon | ................... G06F 1/26 320/108 |
| 2010/0026236 A1* | 2/2010 | Kamiyama | ............. H02J 7/025 320/108 |

(Continued)

FOREIGN PATENT DOCUMENTS

| JP | 2009-165291 | 7/2009 |
| JP | 2014-050271 | 3/2014 |

(Continued)

OTHER PUBLICATIONS

International Search Report of PCT application No. PCT/JP2016/002324 dated Jul. 12, 2016.
(Continued)

*Primary Examiner* — Jared Fureman
*Assistant Examiner* — James P Evans
(74) *Attorney, Agent, or Firm* — Brinks Gilson & Lione

(57) ABSTRACT

Non-contact power supplying appliance includes a plurality of power supply units, communication unit that sends and receives a communication packet, and controller that controls the power supply units and the communication unit, in order to contactlessly transmit power to non-contact power receiving appliance. Communication unit sends a response-request message for placement detection, and thereafter receives a corresponding response message, so that commu-
(Continued)

nication unit completes placement detection of non-contact power receiving appliance. After sending a response-request message for identifying a placement location of the non-contact power receiving appliance, communication unit receives a corresponding response message, so that controller identifies a combination of non-contact power receiving appliance and some of power supply units. Controller controls power supply unit in accordance with a corresponding response message received by communication unit after communication unit sends a response-request message for power control. According to the present aspect, high-precision communication and safe power transmission become possible.

10 Claims, 36 Drawing Sheets

(51) Int. Cl.
  *H02J 50/80* (2016.01)
  *H02J 50/12* (2016.01)
  *H02J 7/02* (2016.01)
  *H02J 7/00* (2006.01)
  *H04B 5/00* (2006.01)

(52) U.S. Cl.
  CPC .............. *H02J 50/80* (2016.02); *H02J 50/90* (2016.02); *H04B 5/0037* (2013.01); *H02J 7/0027* (2013.01); *H02J 2007/0096* (2013.01)

(56) References Cited

U.S. PATENT DOCUMENTS

| | | | |
|---|---|---|---|
| 2010/0079012 A1* | 4/2010 | Hyde | H02J 17/00 307/149 |
| 2013/0207599 A1* | 8/2013 | Ziv | H02J 5/005 320/108 |
| 2015/0054347 A1 | 2/2015 | Amano | |
| 2015/0061398 A1 | 3/2015 | Kudo et al. | |
| 2015/0115729 A1* | 4/2015 | Kanno | H01F 38/14 307/104 |
| 2015/0303714 A1* | 10/2015 | Keeling | H02J 7/0052 320/108 |
| 2016/0006484 A1* | 1/2016 | Swaans | H04B 5/0037 307/104 |
| 2017/0229923 A1* | 8/2017 | Shimokawa | H02J 50/12 |
| 2017/0237296 A1* | 8/2017 | Keith | H02J 7/0042 307/104 |
| 2017/0346346 A1* | 11/2017 | Shimokawa | H02J 50/80 |
| 2018/0048189 A1* | 2/2018 | Park | H02J 50/12 |

FOREIGN PATENT DOCUMENTS

WO  2014/195143 A1  12/2014
WO  2014/204158 A1  12/2014

OTHER PUBLICATIONS

System Description Wireless Power Transfer vol. I:Low Power Part 1:Interface Definition Version 1.1.2 Jun. 2013.
The Extended European Search Report dated Mar. 19, 2018 for the related European Patent Application No. 16796089.7.

* cited by examiner

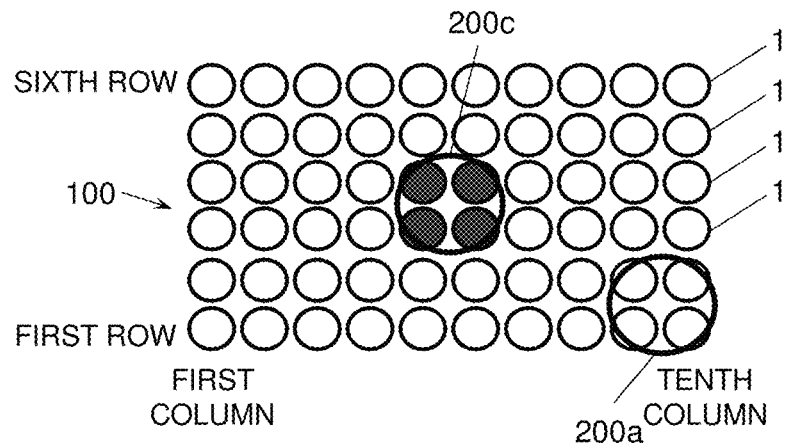
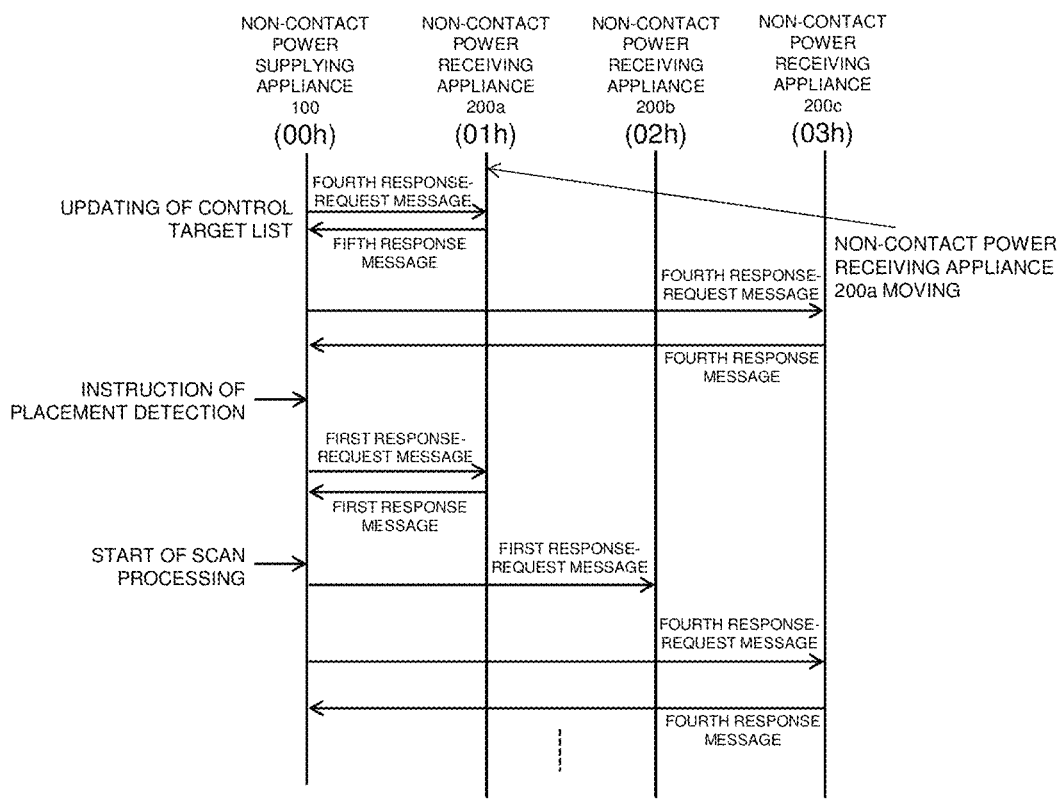

| HEADER | MESSAGE SIZE | SUPPLEMENT |
|---|---|---|
| 0x00...0x1F | 1 + (HEADER - 0) / 32 | 1 x 32 MESSAGE (SIZE 1) |
| 0x20...0x7F | 2 + (HEADER - 32) / 16 | 6 x 16 MESSAGE (SIZE 2...7) |
| 0x80...0xDF | 8 + (HEADER - 128) / 8 | 12 x 8 MESSAGE (SIZE 8...19) |
| 0xE0...0xFF | 20 + (HEADER - 224) / 4 | 8 x 4 MESSAGE (SIZE 20...27) |

FIG. 39

| HEADER | PACKET TYPE | MESSAGE SIZE |
|---|---|---|
| PING STATE | | |
| 0x01 | SIGNAL STRENGTH | 1 |
| 0x02 | END POWER TRANSFER | 1 |
| IDENTIFICATION/SETTING STATE | | |
| 0x06 | POWER CONTROL HOLD OFF | 1 |
| 0x51 | CONFIGURATION | 5 |
| 0x71 | IDENTIFICATION | 7 |
| 0x81 | EXTENDED IDENTIFICATION | 8 |
| POWER SUPPLY STATE | | |
| 0x02 | END POWER TRANSFER | 1 |
| 0x03 | CONTROL ERROR | 1 |
| 0x04 | RECEIVED POWER | 1 |
| 0x05 | CHARGE STATUS | 1 |
| IDENTIFICATION/SETTING STATE, POWER SUPPLY STATE | | |
| 0x18 | PROPRIETARY | 1 |
| 0x19 | PROPRIETARY | 1 |
| 0x28 | PROPRIETARY | 2 |
| 0x29 | PROPRIETARY | 2 |
| 0x38 | PROPRIETARY | 3 |
| 0x48 | PROPRIETARY | 4 |
| 0x58 | PROPRIETARY | 5 |
| 0x68 | PROPRIETARY | 6 |
| 0x78 | PROPRIETARY | 7 |
| 0x84 | PROPRIETARY | 8 |
| 0xA4 | PROPRIETARY | 12 |
| 0xC4 | PROPRIETARY | 16 |
| 0xE2 | PROPRIETARY | 20 |

NON-CONTACT POWER SUPPLYING APPLIANCE AND NON-CONTACT POWER RECEIVING APPLIANCE, AND NON-CONTACT POWER TRANSMITTING SYSTEM PROVIDED THEREWITH

TECHNICAL FIELD

The present disclosure relates to a non-contact power transmitting system.

BACKGROUND ART

Conventionally, in a non-contact power transmitting system, there is known a configuration for carrying out radio communication between a power supplying appliance and a power receiving appliance to improve usability and reliability of the power supplying appliance and the power receiving appliance, (for example, refer to Patent Literature 1).

FIG. 31 is a block configuration diagram of a conventional non-contact power receiving appliance and a conventional non-contact power supplying appliance described in Patent Literature 1. As shown in FIG. 31, in a conventional technique, appliance body 420 corresponds to a non-contact power supplying appliance, and remote control device 401 corresponds to a non-contact power receiving appliance.

Remote control device 401 includes power-receiving resonance circuit 405a and communication resonance circuit 405b. Resonance circuit 405a is used to wirelessly receive power transmitted from appliance body 420, based on a change in a magnetic flux generated from appliance body 420, to input an instruction to appliance body 420 and output information concerning appliance body 420. Resonance circuit 405b is used to wirelessly carry out bidirectional communication of a communication signal with appliance body 420.

Appliance body 420 includes power-supplying resonance circuit 422 corresponding to resonance circuit 405a, communication resonance circuit 421 corresponding to resonance circuit 405b, and communication circuit 423.

FIG. 32, FIG. 33 are diagrams showing a concrete example of a non-contact power supplying appliance according to the conventional technique. The example shown in FIG. 32 is an inductive heating device in which two heating coils 426 are disposed spaced apart. The example shown in FIG. 33 is an inductive heating device in which many relatively small heating coils 426 are closely arranged in a matrix shape. FIG. 34 is a flowchart showing control for a non-contact power supplying appliance to detect remote control device 401 in the conventional technique.

FIG. 35 is a block configuration diagram of a conventional non-contact power receiving appliance and a conventional non-contact power supplying appliance described in Non-Patent Literature 1. Non-Patent Literature 1 prescribes specifications of a non-contact power transmitting system mainly for smartphones and mobile devices.

As shown in FIG. 35, the non-contact power transmitting system prescribed in Non-Patent Literature 1 includes base station 501 and mobile device 502.

From power conversion unit 506 of base station 501, power is contactlessly transmitted to power pick-up unit 507 of mobile device 502. Load 509 of mobile device 502 consumes the transmitted power.

During this period, base station 501 controls a magnitude of the transmitted power, in accordance with a magnitude of requested power transmitted from power receiver 505 of mobile device 502 to power transmitter 504 of base station 501 via communication control unit 508.

FIG. 36 is a state transition diagram of a conventional wireless charging system described in Non-Patent Literature 1. In selection state 601 shown in FIG. 36, the wireless charging system detects whether mobile device 502 is placed on base station 501.

For example, base station 501 detects placement of mobile device 502 by detecting a change in impedance. Upon detecting the placement of mobile device 502, base station 501 transits to ping state 602.

In ping state 602, base station 501 transmits micro power for operating communication control unit 508c, from power conversion unit 506 to power pick-up unit 507 of mobile device 502.

In this situation, when a response from mobile device 502 is not sent to base station 501 within a predetermined period via communication control unit 508, base station 501 returns to selection state 601. When the response is sent, base station 501 continues transmission of the micro power, and transits to identification state/setting state 603.

In identification state/setting state 603, mobile device 502 sends identification information and a magnitude of the requested power to base station 501 via communication control unit 508. When base station 501 determines it is adaptable to the magnitude of the requested power from mobile device 502, base station 501 completes the setting and transits to power supply state 604.

In power supply state 604, power transmission is carried out from power transmitter 504 of base station 501 to power receiver 505 of mobile device 502. The magnitude of transmitted power is controlled in accordance with the magnitude of the requested power transmitted from power receiver 505 of mobile device 502 to power transmitter 504 of base station 501. The transmitted power is consumed by load 509 of mobile device 502.

FIG. 37 shows a format of a communication packet used in the wireless charging system described in Non-Patent Literature 1. As shown in FIG. 37, the format of the communication packet includes preamble 701, header 702, message 703, and checksum 704.

Preamble 701 is data from 11 bytes to 25 bytes for detecting a communication packet. Header 702 is data of 1 byte to which a code corresponding to a type and a size of a message is allocated. Message 703 is data from 1 byte to 27 bytes corresponding to a code of header 702. Checksum 704 is data of 1 byte for detecting a packet error.

FIG. 38 is a diagram showing a relationship between a message size and a code of a header prescribed in Non-Patent Literature 1. FIG. 39 is a diagram showing a message type prescribed in Non-Patent Literature 1.

Non-Patent Literature 1 prescribes to use a message size from 1 byte to 27 bytes obtained by substituting a code within header 702 into an equation shown in FIG. 38. As shown in Non-Patent Literature 1 or FIG. 39, a packet type of a message and a message size corresponding to each code are prescribed. However, a detailed description will be omitted here.

CITATION LIST

Patent Literature

PTL1: Unexamined Japanese Patent Publication No. 2009-165291

Non-Patent Literature

NPL1: System Description Wireless Power Transfer Volume I: Low Power Part 1: Interface Definition Version 1. 1. 2 Jun. 2013

SUMMARY OF THE INVENTION

A prior art described in PTL1 is configured to switch between transmitting only large power from a power supply coil disposed in the appliance body and transmitting micro power and communication data, in accordance with a selection of a cooking container like a pot or a selection of a remote control device including a weak electric circuit like a communication circuit and an information input-output circuit. Therefore, the power supply coil can be shared with a communication coil.

In the prior art described in Non-Patent Literature 1, because the transmitted power is limited to 5 W or less, communication by superimposing data on the transmitted power is easy. Therefore, the power supply coil and the communication coil can be shared by both a power supply side and a power receiving side, and power supply and data communication can be always carried out simultaneously.

However, among general electric appliances, there are some appliances of which power consumption exceeds 1 kW. In this case, both the power supply coil and the communication coil become necessary to carry out the power supply and the data communication simultaneously.

In addition, in the prior art described in Patent Literature 1, when a power supply frequency becomes close to a communication frequency, communication resonance circuit 405$b$ is affected by noise from power-receiving resonance circuit 405$a$. Therefore, when a voltage of transmitted power is 0 V, that is, in a time zone near a zero-cross point, communication of only a limited amount of information can be carried out between communication circuit 423 and resonance circuit 405$b$.

When a non-contact power supplying appliance has a plurality of power-supplying resonance circuits, communication resonance circuits and communication circuits become necessary by the same number of the power supply coils. Therefore, a configuration becomes complex, and manufacturing cost becomes high in some cases.

An object of the present disclosure is to provide a non-contact power transmitting system for solving conventional problems, capable of carrying out high-precision communication and safe power transmission without being affected by noise and having a practical scale.

The non-contact power transmitting system of the present disclosure includes a non-contact power supplying appliance and a non-contact power receiving appliance as described below.

The non-contact power supplying appliance according to one aspect of the present disclosure includes a plurality of power supply units that transmit power, a power-supply side communication unit that sends and receives a communication packet, and a power-supply side controller that controls the power supply units and the power-supply side communication unit, to contactlessly transmit power to the non-contact power receiving appliance.

The power-supply side communication unit sends a response-request message for placement detection of the non-contact power receiving appliance, and thereafter receives a corresponding response message, so that the power-supply side communication unit completes the placement detection of the non-contact power receiving appliance.

The power-supply side communication unit sends a response-request message for identifying a placement location of the non-contact power receiving appliance, and thereafter receives a corresponding response message, so that the power-supply side controller identifies a combination of the non-contact power receiving appliance and some of the power supply units.

After the power-supply side communication unit sends a response-request message for power control, the power-supply side controller controls the power supply units, in accordance with a corresponding response message received by the power-supply side communication unit.

The non-contact power receiving appliance according to one aspect of the present disclosure includes a power receiving unit that receives power, a power-receiving side communication unit that sends and receives a communication packet, and a power measuring unit that measures power under reception by the power receiving unit, to receive power contactlessly transmitted from the non-contact power supplying appliance.

The power-receiving side communication unit, upon receiving a response-request message for placement detection of the non-contact power receiving appliance, sends a corresponding response message.

Upon receiving a response-request message for identifying a placement location of the non-contact power receiving appliance, the power-receiving side communication unit sends a corresponding response message.

Upon receiving a response-request message for controlling power transmitted, the power-receiving side communication unit sends a magnitude of the power measured by the power measuring unit, as a response message.

According to the present disclosure, it is possible to provide a power transmitting system of a practicable scale capable of carrying out high-precision communication and safe power transmission without being affected by noise.

BRIEF DESCRIPTION OF DRAWINGS

FIG. 20A is a plan view schematically showing a situation that a non-contact power receiving appliance is placed at a different position on a non-contact power supplying appliance.

FIG. 20B is a diagram showing a communication sequence between a non-contact power supplying appliance and non-contact power receiving appliances in the situation shown in FIG. 20A.

FIG. 39 is a diagram showing a relationship of a header, a packet type, and a message size of a communication frame form in the wireless charging system according to the conventional technique.

DESCRIPTION OF EMBODIMENTS

Figure 1:
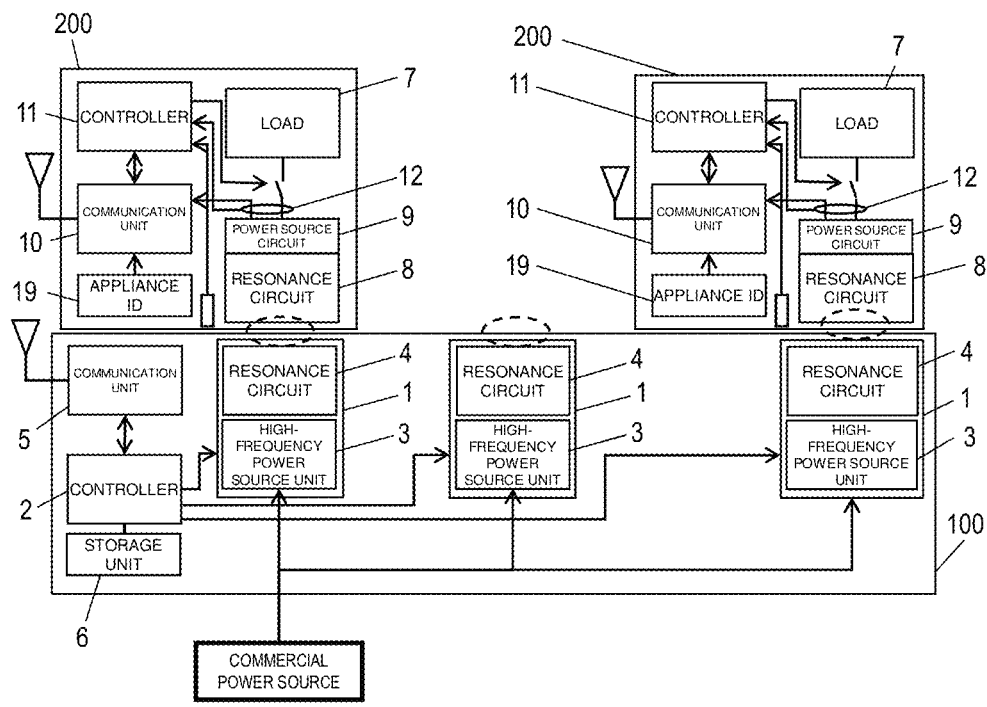
FIG. 1 is a block configuration diagram of a non-contact power supplying appliance and a non-contact power receiving appliance according to an exemplary embodiment of the present disclosure.

A non-contact power supplying appliance according to a first aspect of the present disclosure includes a plurality of power supply units that transmit power, a power-supply side communication unit that sends and receives a communication packet, and a power-supply side controller that controls the power supply units and the power-supply side communication unit, to contactlessly transmit power to a non-contact power receiving appliance.

The power-supply side communication unit sends a response-request message for placement detection of the non-contact power receiving appliance, and thereafter receives a corresponding response message, so that the power-supply side communication unit completes the placement detection of the non-contact power receiving appliance.

The power-supply side communication unit sends a response-request message for identifying a placement location of the non-contact power receiving appliance, and thereafter receives a corresponding response message, so that the power-supply side controller identifies a combination of the non-contact power receiving appliance and some of the power supply units.

After the power-supply side communication unit sends a response-request message for power control, the power-supply side controller controls the power supply unit, in accordance with a corresponding response message received by the power-supply side communication unit.

According to the present aspect, it is possible to provide the non-contact power supplying appliance of a practical scale capable of carrying out high-precision communication and safe power transmission.

The non-contact power supplying appliance according to a second aspect of the present disclosure further includes, in addition to the first aspect, a storage unit that is controlled by the power-supply side controller and stores information communicated via the power-supply side communication unit.

The power supply units are arranged in a matrix shape. In order to identify a combination of the non-contact power receiving appliance and some of the power supply units, the power-supply side controller executes the following process (A) to process (F) by controlling the power supply units, the power-supply side communication unit, and the storage unit.

(A) A process of carrying out power transmission by the power supply units of at least one row, and sending a second response-request message to the non-contact power receiving appliance of which placement detection is completed (B) A process, after receiving a second response message corresponding to the second response-request message, of storing a communication address of the non-contact power receiving appliance and a magnitude of the power under reception by the non-contact power receiving appliance included in the second response message (C) A process of executing process (A) and process (B) to all rows, and identifying a row in which a magnitude of the power under reception becomes largest (D) A process of carrying out power transmission by the power supply units of at least one column, and sending a third response-request message to the non-contact power receiving appliance of which placement detection is completed (E) A process, after receiving a third response message corresponding to the third response-request message, of storing a communication address of the non-contact power receiving appliance and a magnitude of the power under reception by the non-contact power receiving appliance included in the third response message (F) A process of executing process (D) and process (F) to all columns, and identifying a column in which a magnitude of the power under reception becomes largest According to the present aspect, when the non-contact power supplying appliance is an induction heating cooker having a plurality of power supply units arranged in a matrix shape, a combination of the non-contact power receiving appliance and some of the power supply units can be identified.

According to the non-contact power supplying appliance of a third aspect of the present disclosure, in addition to the second aspect, the power-supply side controller excludes the non-contact power receiving appliance to which power is supplied, from power transmission targets, when the power-supply side communication unit does not receive a fourth response message during a predetermined period from the non-contact power receiving appliance that is receiving power after the power-supply side communication unit sends a fourth response-request message to the non-contact power receiving appliance that is receiving the power.

According to the present aspect, when the non-contact power receiving appliance that is receiving power moves, the power transmission is stopped. Therefore, safety of the non-contact power transmitting system can be improved.

According to the non-contact power supplying appliance of a fourth aspect of the present disclosure, in addition to the third aspect, the power-supply side controller executes placement detection after excluding the non-contact power receiving appliance that is receiving the power, from the power transmission targets.

According to the present aspect, in the non-contact power transmitting system, response speed can be improved as well as power consumption can be reduced.

According to the non-contact power supplying appliance of a fifth aspect of the present disclosure, in addition to the fourth aspect, the non-contact power receiving appliance excluded from the power transmission targets is registered again as the power transmission target, when the non-contact power receiving appliance is placed again.

According to the present aspect, usability of the non-contact power transmitting system can be improved.

A non-contact power receiving appliance according to a sixth aspect of the present disclosure includes a power receiving unit that receives power, a power-receiving side communication unit that sends and receives a communication packet, and a power measuring unit that measures the power under reception by the power receiving unit, to receive the power contactlessly transmitted from the non-contact power supplying appliance.

The power-receiving side communication unit, upon receiving a response-request message for placement detection of the non-contact power receiving appliance, sends a corresponding response message.

The power-receiving side communication unit, upon receiving a response-request message for identifying a placement location of the non-contact power receiving appliance, sends a corresponding response message.

Upon receiving a response-request message for controlling power transmitted, the power-receiving side communication unit sends a magnitude of the power measured by the power measuring unit, as a response message.

According to the present aspect, it is possible to provide the non-contact power receiving appliance of a practical scale capable of carrying out high-precision communication and safe power transmission.

The non-contact power receiving appliance according to a seventh aspect of the present disclosure, further includes, in addition to the sixth aspect, a load, and a switching unit that is closed when the non-contact power receiving appliance is placed, is opened when the power transmitted from the non-contact power supplying appliance is supplied to the load and the non-contact power receiving appliance is lifted, and stops the supply of the power to the load. The power-receiving side communication unit sends a response message indicating moving of the non-contact power receiving appliance, when the switching unit is opened.

According to the present aspect, the non-contact power supplying appliance can easily detect the movement of the non-contact power receiving appliance that is receiving power.

A non-contact power transmitting system according to an eighth aspect of the present disclosure includes the non-contact power supplying appliance of the first aspect and the non-contact power receiving appliance of the sixth aspect.

According to the present aspect, it is possible to provide the power transmitting system of a practical scale capable of carrying out high-precision communication and safe power transmission.

The non-contact power transmitting system according to a ninth aspect of the present disclosure further includes, in addition to the eighth aspect, an adapter appliance that receives power from the non-contact power supplying appliance and transmits power to the non-contact power receiving appliance, and sends and receives a communication packet between the non-contact power supplying appliance and the non-contact power receiving appliance.

The power-receiving side communication unit is a power-receiving communication unit that receives power which is load-modulated to send and receive a communication packet.

The non-contact power supplying appliance further includes a zero-cross detector that detects a zero-cross point of a commercial power source, and the power-supply side communication unit is configured to send a timing of the zero-cross point to the adapter appliance.

The adapter appliance includes a power-supply communication unit that contactlessly transmits power to a power-receiving communication unit and sends and receives a communication packet to and from the power-receiving communication unit, and an adapter-side communication unit that communicates with the power-supply side communication unit.

The power-supply side communication unit sends a zero-cross point timing to the adapter-side communication unit, and the power-supply communication unit transmits power and sends and receives a communication packet in accordance with the zero-cross point.

The power-supply side controller is configured to control, for power control, the power supply units in accordance with a communication packet received by the power-supply side communication unit.

According to the present aspect, it is possible to provide the power transmitting system of a practical scale capable of carrying out high-precision communication and safe power transmission.

A non-contact power transmitting system according to a tenth aspect of the present disclosure further includes, in addition to the ninth aspect, an adapter-side power receiving unit that receives the power transmitted from the non-contact power supplying appliance. The power-supply side controller is configured to identify a combination of the adapter-side power receiving unit and some of the power supply units, to identify a placement location of the non-contact power receiving appliance.

According to the present aspect, it is possible to identify placement locations of the adapter appliance and the non-contact power receiving appliance in high precision.

Hereinafter, preferred exemplary embodiments of the present disclosure will be described with reference to the drawings. In the following description, the same or corresponding portions will be attached with the same reference marks, and redundant descriptions will be omitted in some cases.

First Exemplary Embodiment

A first exemplary embodiment of the present disclosure will be described with reference to FIG. 1 to FIG. 25B.

Configuration of Non-contact Power Transmitting System

FIG. 1 is a block configuration diagram of a non-contact power transmitting system according to the present exemplary embodiment. As shown in FIG. 1, the non-contact power transmitting system according to the present exemplary embodiment includes non-contact power supplying appliance 100 and non-contact power receiving appliance 200.

Non-contact power supplying appliance 100 has a plurality of power supply units 1, controller 2, communication unit 5, and storage unit 6. Communication unit 5 is a power-supply side communication unit. Communication unit 5 communicates with communication units 10 of non-contact power receiving appliances 200 described later. Storage unit 6 stores appliance information concerning non-contact power receiving appliances 200 sent from communication unit 10 via communication unit 5.

Power supply unit 1 has high-frequency power source unit 3 and resonance circuit 4. High-frequency power source unit 3 converts power supplied from a commercial power source into high-frequency power. Resonance circuit 4 contactlessly transmits power converted by high-frequency power source unit 3 to resonance circuit 8 of non-contact power receiving appliance 200 described later.

Controller 2 is a power-supply side controller. Based on the above information stored in storage unit 6, controller 2 individually controls each of power supply units 1, and controls power contactlessly transmitted from resonance circuit 4 of power supply unit 1 to resonance circuit 8 that is included in each non-contact power receiving appliance 200.

Non-contact power receiving appliance 200 has load 7, resonance circuit 8, power source circuit 9, communication unit 10, controller 11, and power measuring unit 12. Resonance circuit 8 is a power receiving unit of non-contact power receiving appliance 200 that receives transmitted power. Power source circuit 9 converts the power received by resonance circuit 8, into power for operating load 7. Communication unit 10 is a power-receiving side communication unit that communicates with communication unit 5 of non-contact power supplying appliance 100.

Controller 11 is a controller on a power receiving side. Controller 11 calculates a difference (hereinafter, referred to as a "power error") between a magnitude of the power under reception measured by power measuring unit 12 and rated power of load 7, in order to control power supplied to load 7.

Load 7 is a motor mounted on a juicer, a blender, or the like, or a heater mounted on a thermos, or the like, for example. Non-contact power supplying appliance 100 has a configuration having a plurality of power supply units embedded in a countertop of a kitchen, such as an induction heating cooker, for example.

Format of Communication Packet

Next, there will be described with reference to FIG. 2 a format of a communication packet used for communication between non-contact power supplying appliance 100 and non-contact power receiving appliance 200.

Figure 2:
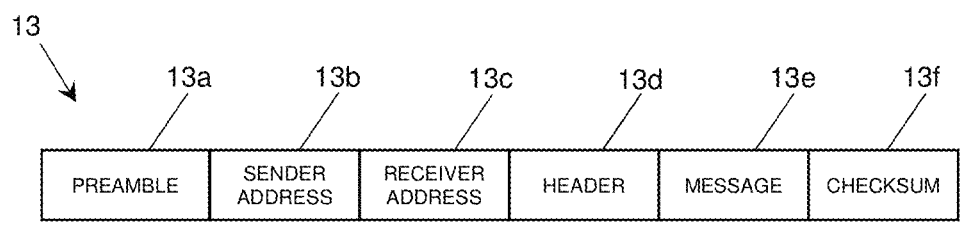
FIG. 2 is a diagram showing a frame format of a communication packet of communication between a non-contact power supplying appliance and a non-contact power receiving appliance.

FIG. 2 shows a frame format of a communication packet. As shown in FIG. 2, format 13 of a communication packet includes preamble 13a, sender address 13b, destination address 13c, header 13d, message 13e, and checksum 13f.

Preamble 13a is used to detect a communication packet. Codes corresponding to a type and a size of a message are allocated to header 13d. Appliance information corresponding to the code allocated to header 13d is stored in message 13e. Checksum 13f is used to detect a packet error.

In the present exemplary embodiment, in a similar manner to that of above Non-Patent Literature 1, the communication packet has preamble 13a of 11 bytes to 25 bytes, sender address 13b of 1 byte, destination address 13c of 1 byte, header 13d of 1 byte, message 13e of 1 byte to 27 bytes, and checksum 13f of 1 byte. A size of message 13e is determined in accordance with a code of header 13d.

Optimum values of sizes of these data change in accordance with a property of a physical layer and application to be realized, and are not limited to the above values.

State Transition of Non-contact Power Transmitting System

Next, state transition of the non-contact power transmitting system of the present exemplary embodiment will be described with reference to FIG. 3 to FIG. 19B. Non-contact power supplying appliance 100 according to the present exemplary embodiment is an induction heating cooker having a plurality of power supply units 1 arranged in a matrix shape.

Figure 3:
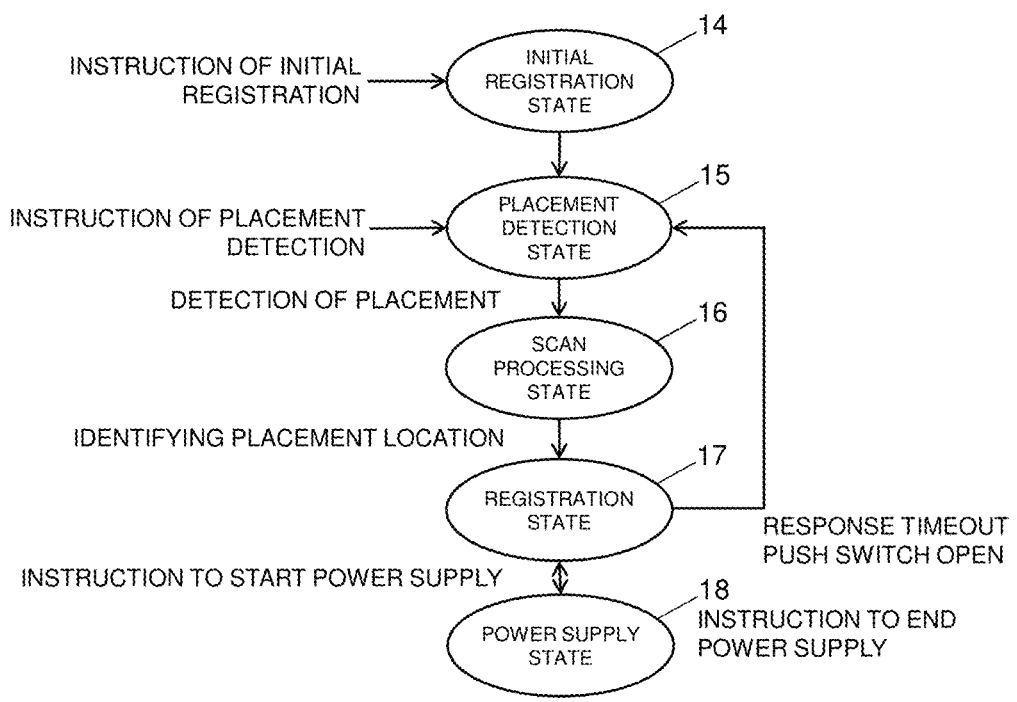
FIG. 3 is a state transition diagram of a non-contact power supplying appliance and a non-contact power receiving appliance.
Figure 4:
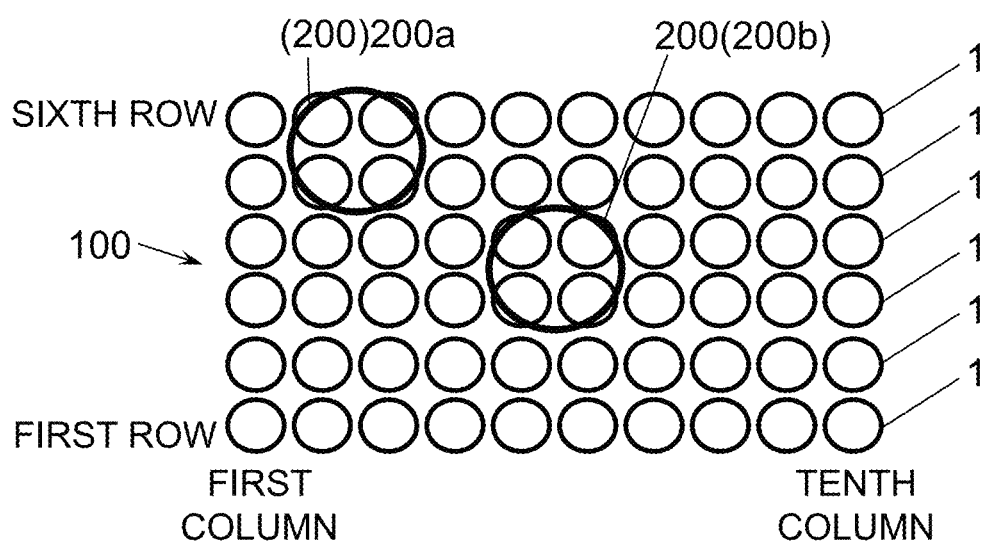
FIG. 4 is a plan view schematically showing a state that two non-contact power receiving appliances are placed on a non-contact power supplying appliance.

FIG. 3 shows state transition of the non-contact power transmitting system of the present exemplary embodiment. FIG. 4 is a plan view schematically showing a situation that non-contact power receiving appliances 200a, 200b are placed on non-contact power supplying appliance 100.

As shown in FIG. 3, the non-contact power transmitting system of the present exemplary embodiment has initial registration state 14, placement detection state 15, scan processing state 16, registration state 17, and power supply state 18.

As shown in FIG. 4, non-contact power supplying appliance 100 has a plurality of power supply units 1 arranged in a matrix shape of n rows in a vertical direction and m columns in a lateral direction. Specifically, n is 6, and m is 10, and 60 power supply units in total are arranged in a matrix shape. Resonance circuits 8 of non-contact power receiving appliances 200 (200a, 200b) have a size of covering four power supply units 1.

Initial Registration

Initial registration state 14 of non-contact power transmitting system according to the present exemplary embodiment will be described with reference to FIG. 3 to FIG. 5B.

Figure 5A:
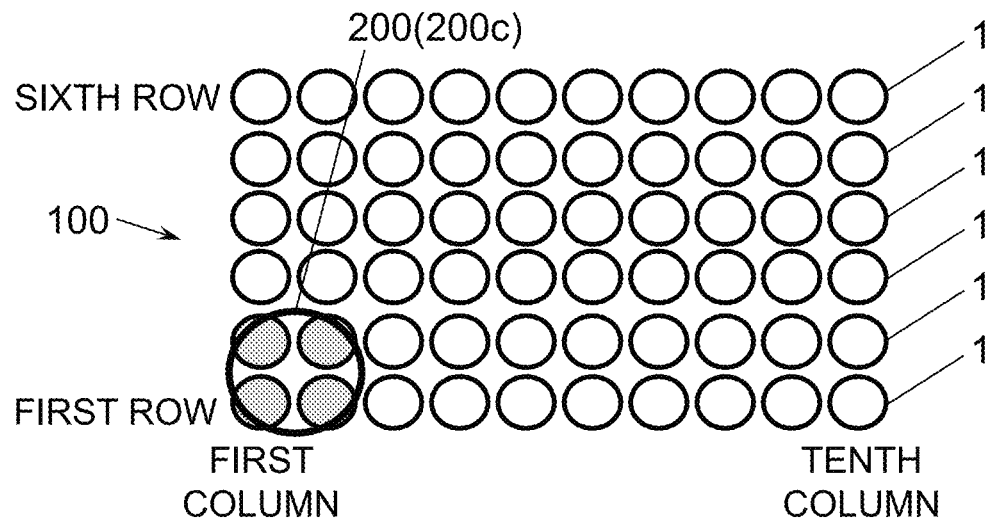
FIG. 5A is a plan view schematically showing a state that a non-contact power receiving appliance is placed at an initial registration position.
Figure 5B:
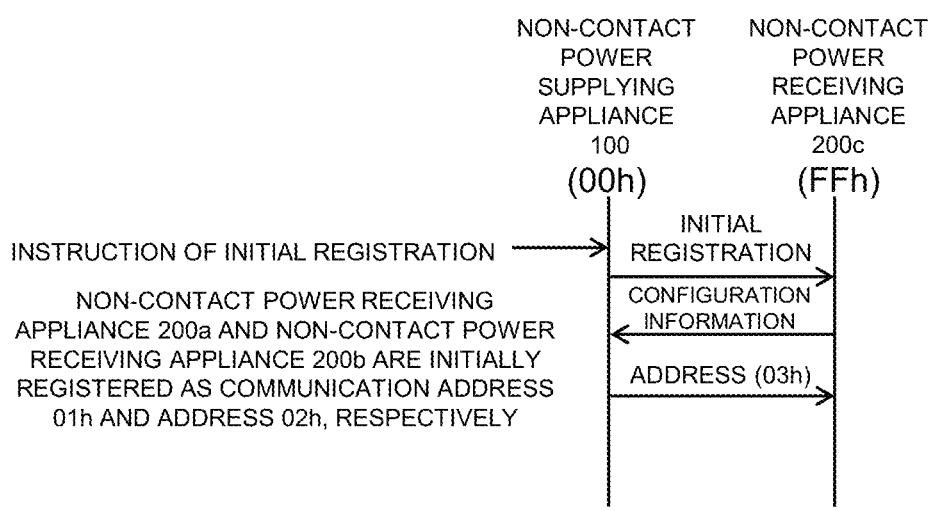
FIG. 5B is a diagram showing a communication sequence between a non-contact power supplying appliance and a non-contact power receiving appliance in initial registration.

FIG. 5A is a plan view schematically showing a state that non-contact power receiving appliance 200 (200c) is placed at an initial registration position on non-contact power supplying appliance 100. FIG. 5B is a diagram showing a communication sequence between non-contact power supplying appliance 100 and non-contact power receiving appliance 200c in initial registration.

In this case, it is assumed that, as shown in FIG. 5A, there are used, for initial registration, four power supply units 1 that are arranged in a first column and a second column from the left of a first row and a second row from the front out of power supply units 1 that are arranged in a matrix shape of n rows and m columns.

In the present disclosure, a j-th row means a j-th row from the front, and a k-th column means a k-th column from the left. In this case, j is a natural number equal to or smaller than n, and k is a natural number equal to or smaller than m.

A user of or a person who places non-contact power supplying appliance 100 instructs initial registration to non-contact power supplying appliance 100, after placing newly purchased non-contact power receiving appliance 200 at an initial registration position.

In the present exemplary embodiment, the initial registration position is a position that corresponds to four power supply units 1 arranged in the first column and the second column of the first row and the second row. The instruction of the initial registration means pressing a start key of the initial registration disposed on an operation panel (not shown) of non-contact power supplying appliance 100, for example.

As shown in FIG. 5B, non-contact power supplying appliance 100 has a predetermined communication address (00h). Because non-contact power receiving appliance 200 has a communication address allocated at the time of being registered in non-contact power supplying appliance 100, an individual communication address is not set in non-contact power receiving appliance 200 before initial registration. Therefore, FIG. 5B shows a case of using (FFh) as a communication address of non-contact power receiving appliance 200.

As shown in FIG. 5A and FIG. 5B, in non-contact power supplying appliance 100, when controller 2 receives an instruction for initial registration, controller 2 controls four power supply units 1 for initial registration to transmit power necessary for communication unit 10 to operate.

Thereafter, controller 2 controls communication unit 5 so as to send a communication packet that stores communication address (00h) of the non-contact power supplying appliance in sender address 13b, stores communication address (FFh) of non-contact power receiving appliance 200 for initial registration in destination address 13c, and stores a code meaning the initial registration in header 13d.

In response to the received communication packet for the initial registration, controller 11 of non-contact power receiving appliance 200 controls communication unit 10 to send the communication packet.

In the communication packet to be sent, there are stored communication address (FFh) of non-contact power receiving appliance 200 for initial registration, that is, the self, in sender address 13b, communication address (00h) of non-contact power supplying appliance 100 in destination address 13c, and a code indicating storing of the appliance information of non-contact power receiving appliance 200 in message 13e, in header 13d.

The appliance information stored in message 13e includes appliance ID 19 that is set for each power receiving appliance, rated power of load 7, and a diameter of a coil included in resonance circuit 8.

When communication unit 5 receives the communication packet from non-contact power receiving appliance 200 for initial registration, controller 2 compares appliance ID 19 included in the communication packet with each of appliance IDs 19 of non-contact power receiving appliances 200 which have been initially registered, respectively.

When both appliance IDs 19 coincide with each other, controller 2 controls communication unit 5 so as to send a communication packet that stores the communication address information of initially registered non-contact power receiving appliance 200 in message 13e, to non-contact power receiving appliance 200 which is to be initially registered, and ends the initial registration.

When both appliance IDs 19 do not coincide with each other, controller 2 controls communication unit 5 so as to send a communication packet that stores a new communication address in message 13e, to non-contact power receiving appliance 200 which is to be initially registered, and ends the initial registration. Thereafter, non-contact power receiving appliance 200 recognizes that the communication address sent from non-contact power supplying appliance 100 is for exclusive use of the self, and sends and receives a communication packet by using this communication address.

The example shown in FIG. 5A and FIG. 5B suggests that at least three non-contact power receiving appliances 200 exist. That is, this example indicates a case where non-contact power supplying appliance 100 carries out initial registration of non-contact power receiving appliance 200c in a situation that communication address (01h) and communication address (02h) are allocated to non-contact power receiving appliance 200a and non-contact power receiving appliance 200b.

Specifically, when non-contact power receiving appliance 200c is placed at an initial registration position and initial registration is instructed, controller 2 controls power supply unit 1 provided at the initial registration position to transmit power necessary to operate communication unit 10 of non-contact power receiving appliance 200c. Further, controller 2 controls communication unit 5 so as to send a communication packet for initial registration to communication unit 10 of non-contact power receiving appliance 200c.

When communication unit 10 receives the communication packet for initial registration, controller 11 controls communication unit 10 to send a communication packet storing appliance information.

When communication unit 5 receives the communication packet sent from non-contact power receiving appliance 200c, controller 2 compares appliance ID 19 included in the sent communication packet with appliance ID 19 stored in storage unit 6 and appliance ID 19 of non-contact power receiving appliance 200b.

When all appliance IDs 19 coincide with each other, controller 2 sends a communication packet that stores, in message 13e, communication address (01h) of non-contact power receiving appliance 200a or communication address (02h) of non-contact power receiving appliance 200b, to non-contact power receiving appliance 200c, and ends the initial registration.

When appliance IDs 19 do not coincide with each other, controller 2 sends a communication packet that stores, in message 13e, newly allocated communication address (03h) allocated to non-contact power receiving appliance 200c, to non-contact power receiving appliance 200c, and ends the initial registration.

Thereafter, non-contact power receiving appliance 200c uses communication address (03h) sent from non-contact power supplying appliance 100 as a sender address and as a destination address of the self, and sends and receives a communication packet to and from non-contact power supplying appliance 100.

There is described here a case where non-contact power receiving appliance 200 is newly purchased and the user or the person who places non-contact power receiving appliance 200 carries out initial registration of non-contact power receiving appliance 200. In the case of marketing non-contact power supplying appliance 100 and non-contact power receiving appliance 200 as a combination, work of initial registration can be omitted by registering in advance non-contact power receiving appliance 200 in non-contact power supplying appliance 100 in a manufacturing process.

Appliance ID 19 of non-contact power receiving appliance 200 may be prescribed by combining maker codes allocated to makers by a standard organization and codes own to the makers, for example.

Placement Detection

Next, placement detection state 15 of a non-contact power transmitting system according to the present exemplary embodiment will be described with reference to FIG. 6A, FIG. 6B.

Figure 6A:
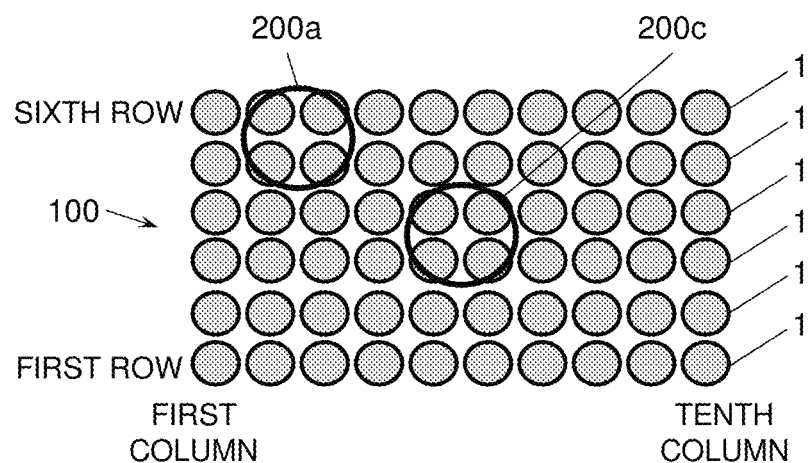
FIG. 6A is a plan view schematically showing a state that two non-contact power receiving appliances are placed on a non-contact power supplying appliance.

FIG. 6A is a plan view schematically showing a state that non-contact power receiving appliances 200a, 200c are placed on non-contact power supplying appliance 100. FIG. 6B is a diagram showing a communication sequence between a non-contact power supplying appliance and a non-contact power receiving appliance in placement detection of a non-contact power receiving appliance.

Figure 6B:
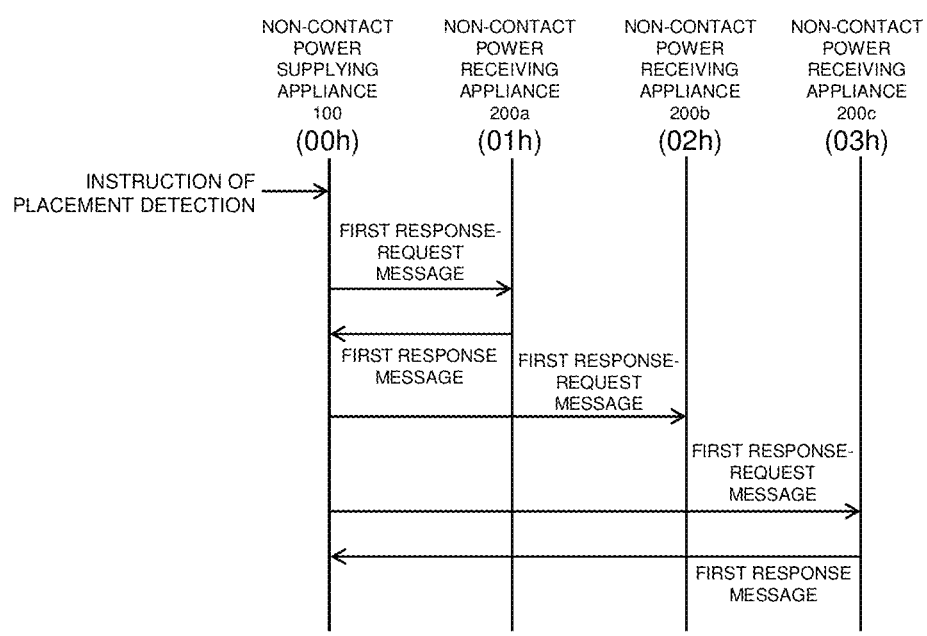
FIG. 6B is a diagram showing a communication sequence between a non-contact power supplying appliance and non-contact power receiving appliances in placement detection of the non-contact power receiving appliances.

In the example shown in FIG. 6A and FIG. 6B, three non-contact power receiving appliances (non-contact power receiving appliances 200a, 200b, 200c) are already initially registered, and non-contact power supplying appliance 100 executes placement detection in a situation that two of the non-contact power receiving appliances (non-contact power receiving appliances 200a, 200c) are placed on non-contact power supplying appliance 100.

Instruction of placement detection in the communication sequence shown in FIG. 6B is executed by the user pressing a start key of placement detection provided in non-contact power supplying appliance 100.

Non-contact power supplying appliance 100 may periodically automatically detect whether non-contact power receiving appliance 200 is placed. In this case, controller 2 controls all of power supply units 1 so as to supply power necessary to operate communication units 10 of non-contact power receiving appliances 200a to 200c.

Further, controller 2 controls communication unit 5 so as to send a communication packet that stores a first response-request message for placement detection, to non-contact power receiving appliances 200a, 200b, 200c.

In non-contact power receiving appliances 200a, 200c, upon receiving the first response-request message, controller 11 controls communication unit 10 to send a communication packet that stores a magnitude of the power measured by power measuring unit 12 as a first response message corresponding to the first response-request message.

Upon receiving the communication packet sent from non-contact power receiving appliance 200a, controller 2 stores in storage unit 6, communication address (01h) of non-contact power receiving appliance 200a and a magnitude of the power under reception. Upon further receiving the communication packet sent from non-contact power receiving appliance 200c, controller 2 stores in storage unit 6, communication address (03h) of non-contact power receiving appliance 200c and a magnitude of the power under reception.

Non-contact power supplying appliance 100 ends placement detection in placement detection state 15, and transits to scan processing state 16, in order to identify placement locations of non-contact power receiving appliances 200a, 200c.

When the placement locations of non-contact power receiving appliances are identified, which power supply units are transmitting power to which non-contact power receiving appliances becomes clear. In the present disclosure, this will be expressed as identifying a combination of the non-contact power receiving appliance and some of the power supply units.

Identifying Placement Location

Next, there will be described scan processing state 16 of a non-contact power transmitting system according to the present exemplary embodiment.

In the present exemplary embodiment, controller 2 determines the numbers of rows and columns to which scan processing is to be simultaneously executed, based on appliance information of non-contact power receiving appliance 200 detected in placement detection state 15, out of appliance information of non-contact power receiving appliance 200 stored in storage unit 6.

For example, when the diameter of a coil included in resonance circuit 8 of detected non-contact power receiving appliance 200 is a size for two power supply units 1, controller 2 simultaneously carries out scan processing to power supply units 1 disposed in adjacent two rows or two columns. In this case, j, k described later are 2.

In process (A) of the scan processing, controller 2 controls power supply unit 1 disposed in the first row to j-th row so as to supply power necessary to operate communication unit 10 of detected non-contact power receiving appliance 200. Controller 2 further controls communication unit 5 so as to send a second response-request message for identifying a placement location, to detected non-contact power receiving appliance 200.

When detected non-contact power receiving appliance 200 is placed above power supply unit 1 disposed in the first row to j-th row, detected non-contact power receiving appliance 200 receives a second response-request message, and sends a magnitude of the power under reception to non-contact power supplying appliance 100 as a second response message corresponding to the second response-request message.

Hereinafter, power supply unit 1 which is disposed in the j-th row will be expressed as j-th row power supply unit 1, and that non-contact power receiving appliance 200 is placed above power supply unit 1 which is disposed in the j-th row will be expressed as non-contact power receiving appliance 200 is placed on the j-th row.

When detected non-contact power receiving appliance 200 is not placed on the first row to j-th row, this non-contact power receiving appliance does not receive a second response-request message, and therefore, does not send a second response message.

In process (B) of the scan processing, when communication unit 5 receives a second response message from non-contact power receiving appliance 200 that receives a second response-request message, controller 2 stores in storage unit 6, a communication address of non-contact power receiving appliance 200 which sends the second response message stored in the second response message and a magnitude of the power under reception.

In process (C) of the scan processing, controller 2 executes process (A) and process (B) of the scan processing to all rows by shifting each one row, and identifies a row in which a magnitude of the power received by non-contact power receiving appliance 200 that sends the second response message becomes the largest.

By executing process (A) to process (C) of the scan processing, controller 2 can identify presence or absence of sending of a second response message from detected non-contact power receiving appliance 200, and can identify a row on which detected non-contact power receiving appliance 200 is placed, from a magnitude of the power under reception of non-contact power receiving appliance 200 that sends the second response message.

In process (D) of the scan processing, controller 2 controls power supply units 1 disposed in the first row to k-th row so as to supply power necessary to operate communication unit 10 of detected non-contact power receiving appliance 200. Controller 2 further controls communication unit 5 so as to send a third response-request message for identifying a placement location, to detected non-contact power receiving appliance 200.

When detected non-contact power receiving appliance 200 is disposed on the first column to k-th column, this non-contact power receiving appliance receives a third response-request message sent from non-contact power supplying appliance 100, and sends a magnitude of the power under reception to non-contact power supplying appliance 100 as a third response message corresponding to the third response-request message.

When detected non-contact power receiving appliance 200 is not placed on the first column to k-th column, this non-contact power receiving appliance does not receive a third response-request message, and therefore, does not send a third response message.

In process (E) of the scan processing, when communication unit 5 receives a third response message from non-contact power receiving appliance 200 that receives a third response-request message, controller 2 stores in storage unit 6, a communication address of non-contact power receiving appliance 200 which sends the third response message and a magnitude of the power under reception.

In process (F) of the scan processing, controller 2 executes process (D) and process (E) of the scan processing to all columns by shifting each one column, and identifies a column in which a magnitude of the power received by non-contact power receiving appliance 200 that sends the third response message becomes the largest.

By executing process (D) to process (F) of the scan processing, controller 2 can identify presence or absence of sending of a third response message from detected non-contact power receiving appliance 200, and can identify a column on which detected non-contact power receiving appliance 200 is placed, from a magnitude of the power under reception by non-contact power receiving appliance 200 that sends the third response message.

Controller 2 identifies a combination of detected non-contact power receiving appliance 200 and some of power supply units 1, from the row identified by process (C) of the scan processing and the column identified by process (F) of the scan processing.

Scan processing state 16 will be concretely described with reference to FIG. 7A to FIG. 16B.

Figure 7A:
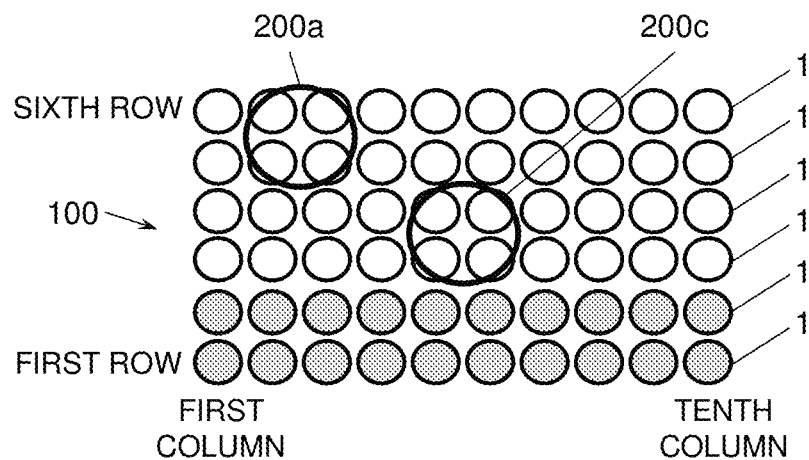
FIG. 7A is a plan view schematically showing a situation of scan processing according to a first exemplary embodiment.
Figure 7B:
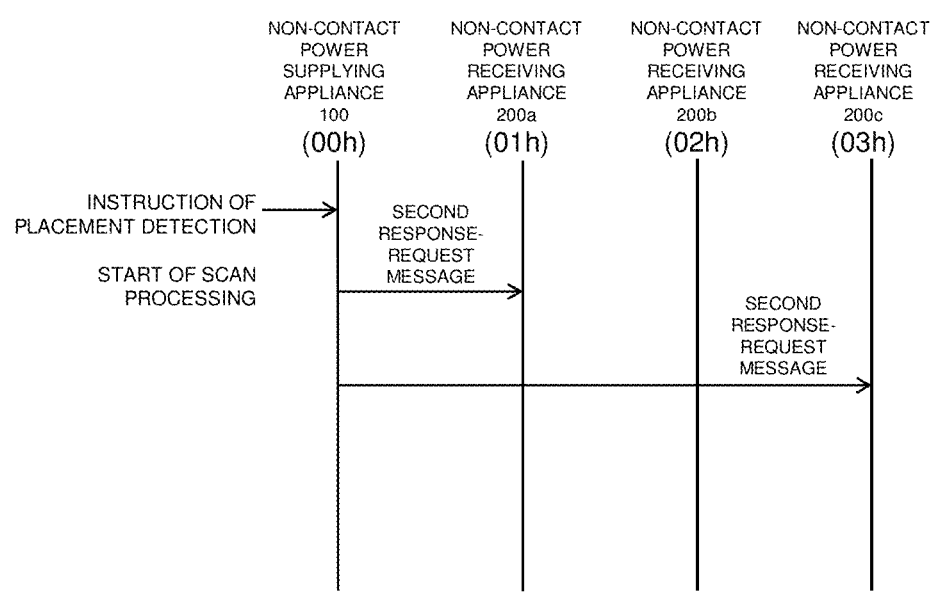
FIG. 7B is a diagram showing a communication sequence between a non-contact power supplying appliance and non-contact power receiving appliances in the situation shown in FIG. 7A.

FIG. 7A is a plan view schematically showing a situation of scan processing applied to the first row and the second row. FIG. 7B is a diagram showing a communication sequence between a non-contact power supplying appliance and non-contact power receiving appliances in the situation shown in FIG. 7A.

Here, it is assumed that placement detection in placement detection state 15 has ended and controller 2 recognizes that non-contact power receiving appliances 200a, 200c are placed on non-contact power supplying appliance 100.

In this situation, controller 2 first determines the numbers of rows and columns to which scan processing is to be simultaneously executed, in accordance with appliance information of non-contact power receiving appliances 200a, 200c that are stored in storage unit 6, particularly, in accordance with a diameter of a coil included in each resonance circuit 8.

As shown in FIG. 7A, in the present exemplary embodiment, a diameter of each resonance circuit 8 of non-contact power receiving appliances 200a, 200c is assumed to be in a size for two power supply units 1. Controller 2 sets 2 as the numbers of rows and columns to which scan processing is to be executed simultaneously.

In process (A) of the scan processing, controller 2 controls power supply units 1 meshed in a grey color in the first row and the second row so as to supply power necessary to operate communication units 10 of non-contact power receiving appliances 200a, 200c.

As shown in FIG. 7B, controller 2 further controls communication unit 5 so as to send a communication packet that stores a second response-request message, to communication address ($01h$) of non-contact power receiving appliance 200a and communication address ($03h$) of non-contact power receiving appliance 200c.

In this case, because non-contact power receiving appliances 200a, 200c are not placed on the first row and the second row, non-contact power receiving appliances 200a, 200c cannot receive power, do not receive a second response-request message, and do not send a second response message.

Figure 8A:
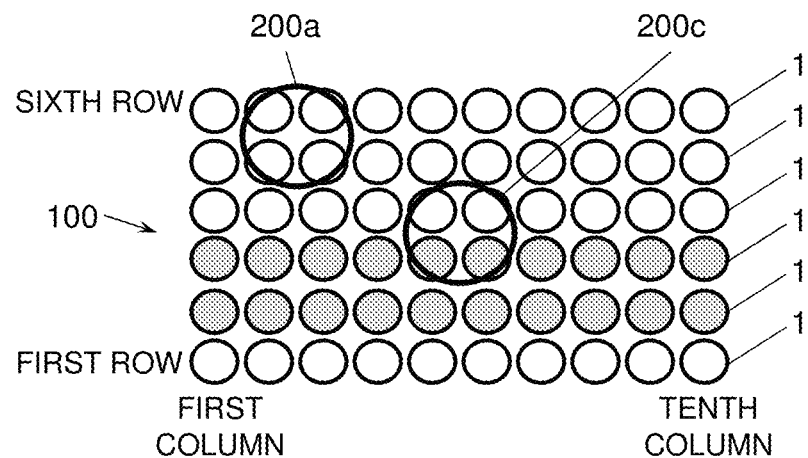
FIG. 8A is a plan view schematically showing a situation of scan processing.
Figure 8B:
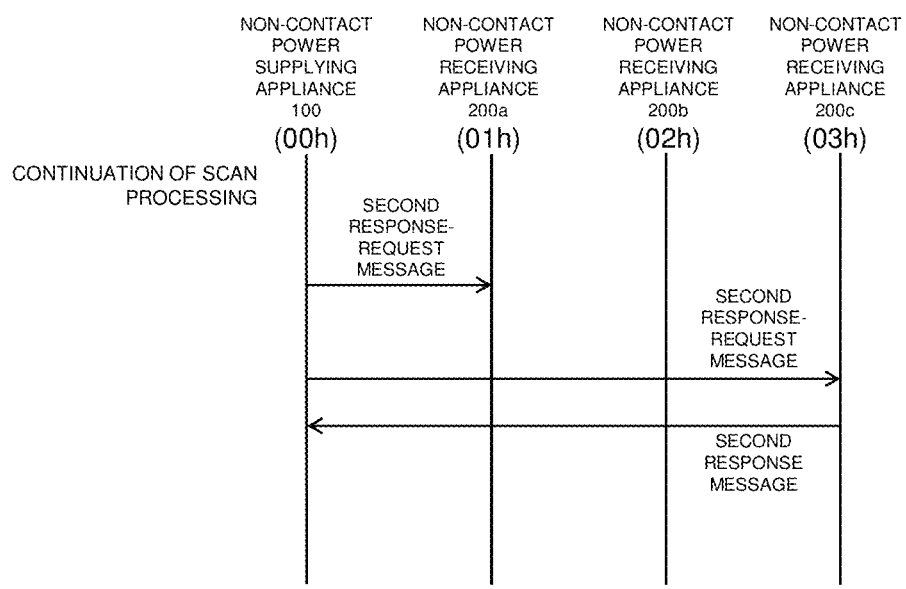
FIG. 8B is a diagram showing a communication sequence between a non-contact power supplying appliance and non-contact power receiving appliances in the situation shown in FIG. 8A.

FIG. 8A is a plan view schematically showing a situation of scan processing applied to the second row and the third row. FIG. 8B is a diagram showing a communication sequence between a non-contact power supplying appliance and non-contact power receiving appliances in the situation shown in FIG. 8A.

As shown in FIG. 8A, in process (A) of the scan processing, controller 2 controls power supply units 1 meshed in a grey color in the second row and the third row so as to supply power necessary to operate each communication unit 10 of non-contact power receiving appliances 200a, 200c.

As shown in FIG. 8B, controller 2 further controls communication unit 5 so as to send a communication packet that stores a second response-request message, to communication address ($01h$) of non-contact power receiving appliance 200a and communication address ($03h$) of non-contact power receiving appliance 200c.

Because non-contact power receiving appliance 200c is placed on the third row and the fourth row, communication unit 10 of non-contact power receiving appliance 200c receives power transmitted from power supply unit 1 of the third row, and receives a second response message sent from communication unit 5.

On the other hand, because non-contact power receiving appliance 200a is placed neither on the second row nor on the third row, non-contact power receiving appliance 200a cannot receive power, does not receive a second response-request message, and does not send a second response message.

In non-contact power receiving appliance 200c, upon receiving a second response-request message, controller 11 controls communication unit 10 to send a magnitude of the power detected by power measuring unit 12 as a second response message.

In non-contact power supplying appliance 100, when communication unit 5 receives a second response message, in process (B) of the scan processing, controller 2 stores in storage unit 6, communication address ($03h$) of non-contact power receiving appliance 200c and a magnitude of the power under reception.

Figure 9A:
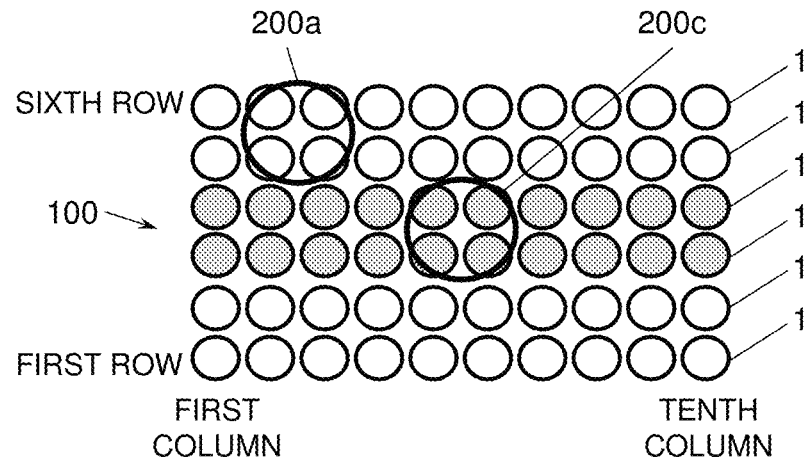
FIG. 9A is a plan view schematically showing a situation of scan processing.
Figure 9B:
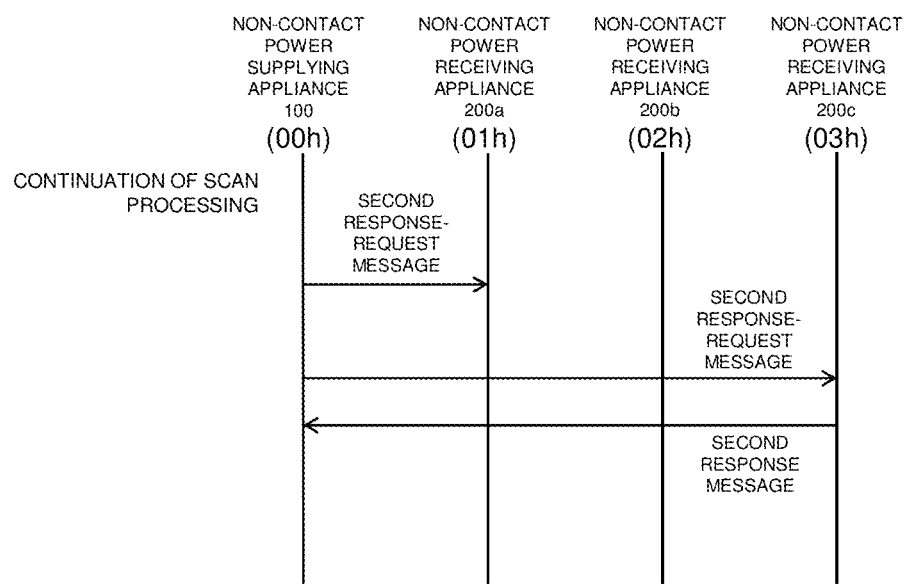
FIG. 9B is a diagram showing a communication sequence between a non-contact power supplying appliance and non-contact power receiving appliances in the situation shown in FIG. 9A.

FIG. 9A is a plan view schematically showing a situation of scan processing applied to the third row and the fourth row. FIG. 9B is a diagram showing a communication sequence between a non-contact power supplying appliance and non-contact power receiving appliances in the situation shown in FIG. 9A.

As shown in FIG. 9A, in process (A) of the scan processing, controller 2 controls power supply units 1 meshed in a grey color in the third row and the fourth row so as to supply power necessary to operate each communication unit 10 of non-contact power receiving appliances 200a, 200c.

As shown in FIG. 9B, controller 2 further controls communication unit 5 so as to send a communication packet that stores a second response-request message, to communication address (01h) of non-contact power receiving appliance 200a and communication address (03h) of non-contact power receiving appliance 200c.

Because non-contact power receiving appliance 200c is placed on the third row and the fourth row, communication unit 10 of non-contact power receiving appliance 200c receives power transmitted from power supply units 1 of the third row and the fourth row, and receives a second response-request message sent from communication unit 5.

On the other hand, because non-contact power receiving appliance 200a is placed neither on the third row nor on the fourth row, non-contact power receiving appliance 200a cannot receive power, does not receive a second response-request message, and does not send a second response message.

In non-contact power receiving appliance 200c, when communication unit 10 receives a second response-request message, controller 11 controls communication unit 10 to send a magnitude of the power detected by power measuring unit 12, as a second response message.

In non-contact power supplying appliance 100, when communication unit 5 receives a second response message, in process (B) of the scan processing, controller 2 stores in storage unit 6, communication address (03h) of non-contact power receiving appliance 200c and a magnitude of the power under reception.

In non-contact power receiving appliance 200c, a magnitude of the power detected by power measuring unit 12 becomes larger in the situation shown in FIG. 9A than that in the situation shown in FIG. 8A. Therefore, in process (C) of the scan processing, controller 2 can identify a row in which a magnitude of the power received by non-contact power receiving appliance 200c becomes largest, and can recognize that non-contact power receiving appliance 200c is placed on the third row and the fourth row.

Figure 10A:
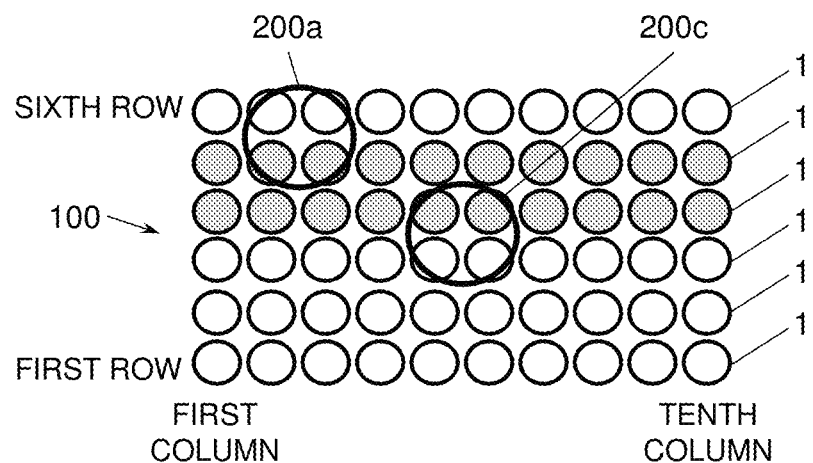
FIG. 10A is a plan view schematically showing a situation of scan processing.
Figure 10B:
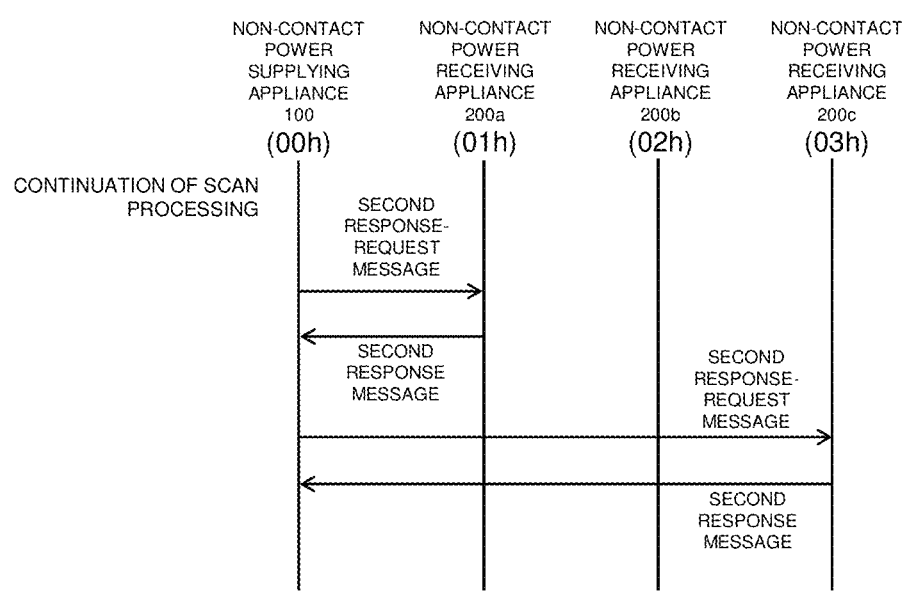
FIG. 10B is a diagram showing a communication sequence between a non-contact power supplying appliance and non-contact power receiving appliances in the situation shown in FIG. 10A.

FIG. 10A is a plan view schematically showing a situation of scan processing applied to the fourth row and the fifth row. FIG. 10B is a diagram showing a communication sequence between a non-contact power supplying appliance and non-contact power receiving appliances in the situation shown in FIG. 10A.

As shown in FIG. 10A, in process (A) of the scan processing, controller 2 controls power supply units 1 meshed in a grey color in the fourth row and the fifth row so as to supply power necessary to operate communication units 10 of non-contact power receiving appliances 200a, 200c.

As shown in FIG. 10B, controller 2 further controls communication unit 5 so as to send a communication packet that stores a second response-request message, to communication address (01h) of non-contact power receiving appliance 200a and communication address (03h) of non-contact power receiving appliance 200c.

Because non-contact power receiving appliance 200a is placed on the fifth row and the sixth row, communication unit 10 of non-contact power receiving appliance 200a receives the power transmitted from power supply unit 1 of the fifth row, and receives a second response message sent from communication unit 5.

On the other hand, because non-contact power receiving appliance 200c is placed on the third row and the fourth row, communication unit 10 of non-contact power receiving appliance 200c receives the power transmitted from power supply unit 1 of the fourth row, and receives a second response message sent from communication unit 5.

In non-contact power receiving appliances 200a, 200c, upon receiving a second response-request message, controller 11 controls communication unit 10 to send a magnitude of the power detected by power measuring unit 12 to non-contact power supplying appliance 100 as a second response message.

In non-contact power supplying appliance 100, when communication unit 5 receives a second response message, in process (B) of the scan processing, controller 2 stores in storage unit 6, communication address (01h) of non-contact power receiving appliance 200a, a magnitude of the power under reception, communication address (03h) of non-contact power receiving appliance 200c and a magnitude of the power under reception.

Figure 11A:
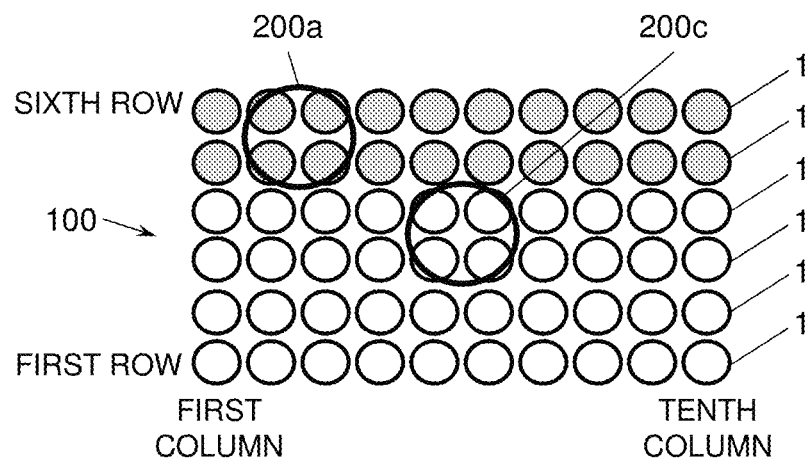
FIG. 11A is a plan view schematically showing a situation of scan processing.
Figure 11B:
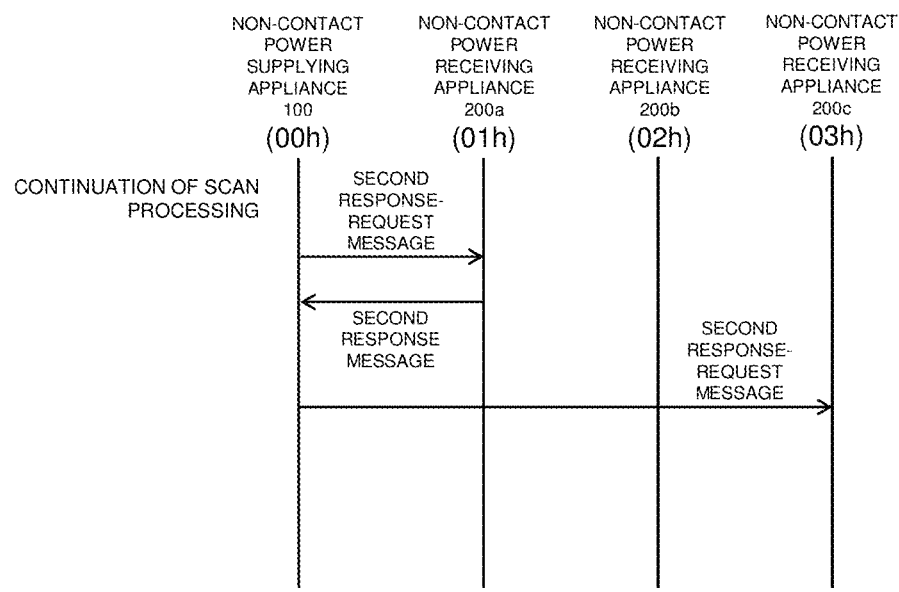
FIG. 11B is a diagram showing a communication sequence between a non-contact power supplying appliance and non-contact power receiving appliances in the situation shown in FIG. 11A.

FIG. 11A is a plan view schematically showing a situation of scan processing applied to the fifth row and the sixth row. FIG. 11B is a diagram showing a communication sequence between a non-contact power supplying appliance and non-contact power receiving appliances in the situation shown in FIG. 11A.

As shown in FIG. 11A, in process (A) of the scan processing, controller 2 controls power supply units 1 meshed in a grey color in the fifth row and the sixth row so as to supply power necessary to operate each communication unit 10 of non-contact power receiving appliances 200a, 200c.

As shown in FIG. 11B, controller 2 further controls communication unit 5 so as to send a communication packet that stores a second response-request message, to communication address (01h) of non-contact power receiving appliance 200a and communication address (03h) of non-contact power receiving appliance 200c.

Because non-contact power receiving appliance 200a is placed on the fifth row and the sixth row, communication unit 10 of non-contact power receiving appliance 200a receives power transmitted from power supply units 1 of the fifth row and the sixth row, and receives a second response message sent from communication unit 5.

On the other hand, because non-contact power receiving appliance 200c is placed neither on the fifth row nor on the sixth row, non-contact power receiving appliance 200c cannot receive power, does not receive a second response-request message, and does not send a second response message.

In non-contact power receiving appliance 200a, when communication unit 10 receives a second response-request message, controller 11 controls communication unit 10 to send a magnitude of the power detected by power measuring unit 12, as a second response message.

In non-contact power supplying appliance 100, when communication unit 5 receives a second response message, in process (B) of the scan processing, controller 2 stores in storage unit 6, communication address (01h) of non-contact power receiving appliance 200a and a magnitude of the power under reception.

In non-contact power receiving appliance 200a, a magnitude of the power detected by power measuring unit 12 becomes larger in the situation shown in FIG. 11A than that in the situation shown in FIG. 10A. Therefore, in process (C) of the scan processing, controller 2 can identify a row in which a magnitude of the power received by non-contact power receiving appliance 200a becomes largest, and can recognize that non-contact power receiving appliance 200a is placed on the fifth row and the sixth row.

Figure 12A:
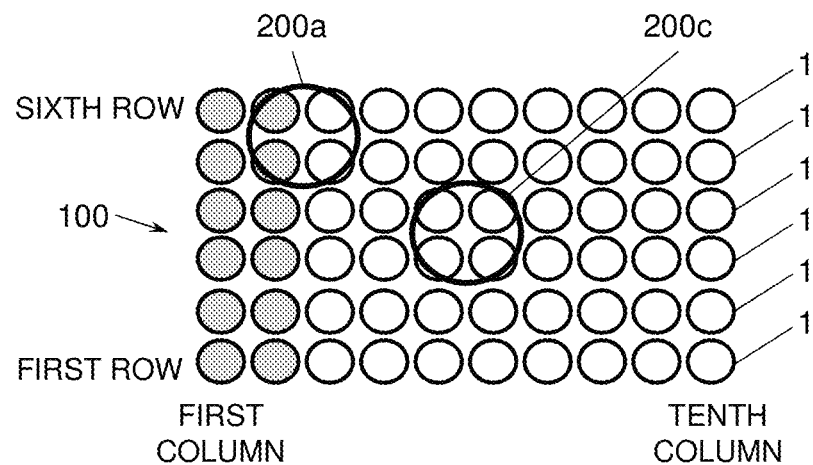
FIG. 12A is a plan view schematically showing a situation of scan processing.
Figure 12B:
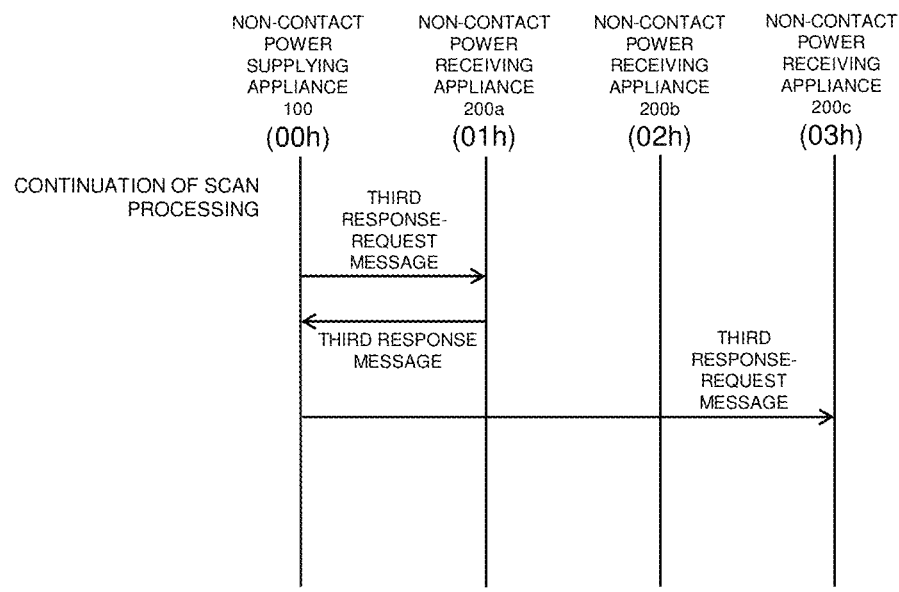
FIG. 12B is a diagram showing a communication sequence between a non-contact power supplying appliance and non-contact power receiving appliances in the situation shown in FIG. 12A.

FIG. 12A is a plan view schematically showing a situation of scan processing applied to the first column and the second column. FIG. 12B is a diagram showing a communication sequence between a non-contact power supplying appliance and non-contact power receiving appliances in the situation shown in FIG. 12A.

As shown in FIG. 12A, in process (D) of the scan processing, controller 2 controls power supply units 1 meshed in a grey color in the first column and the second column so as to supply power necessary to operate each communication unit 10 of non-contact power receiving appliances 200a, 200c.

As shown in FIG. 12B, controller 2 further sends a communication packet that stores a third response-request message, to communication address (01h) of non-contact power receiving appliance 200a and communication address (03h) of non-contact power receiving appliance 200c.

Because non-contact power receiving appliance 200a is placed on the second column and the third column, communication unit 10 of non-contact power receiving appliance 200a receives power transmitted from power supply unit 1 of the second column, and receives a third response message sent from communication unit 5.

On the other hand, because non-contact power receiving appliance 200c is placed neither on the first column nor on the second column, non-contact power receiving appliance 200c cannot receive power, does not receive a third response-request message, and does not send a third response message.

Through process (A) to process (C), when a row on which non-contact power receiving appliance 200 is placed is identified, controller 2 may not supply power to power supply unit 1 on a row on which non-contact power receiving appliance 200 is not placed. Accordingly, energy saving performance of non-contact power supplying appliance 100 can be improved.

Specifically, as shown in FIG. 12A, when non-contact power receiving appliance 200 is placed neither on the first row nor on the second row, in process (D) of the scan processing, controller 2 may not supply power to power supply units 1 of the first row and the second row out of power supply units 1 meshed in a grey color in the first column and the second column.

In non-contact power receiving appliance 200a, upon receiving a third response-request message, controller 11 controls communication unit 10 to send a magnitude of the power detected by power measuring unit 12 as a third response message.

In non-contact power supplying appliance 100, when communication unit 5 receives a third response message, in process (E) of the scan processing, controller 2 stores in storage unit 6, communication address (01h) of non-contact power receiving appliance 200a and a magnitude of the power under reception.

Figure 13A:
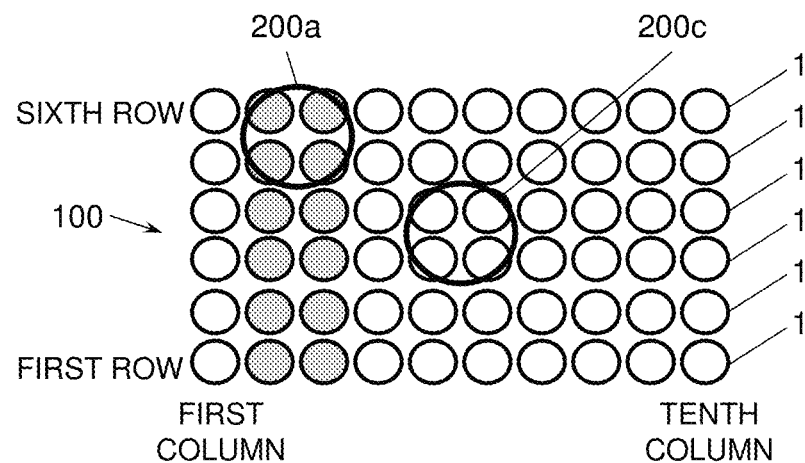
FIG. 13A is a plan view schematically showing a situation of scan processing.
Figure 13B:
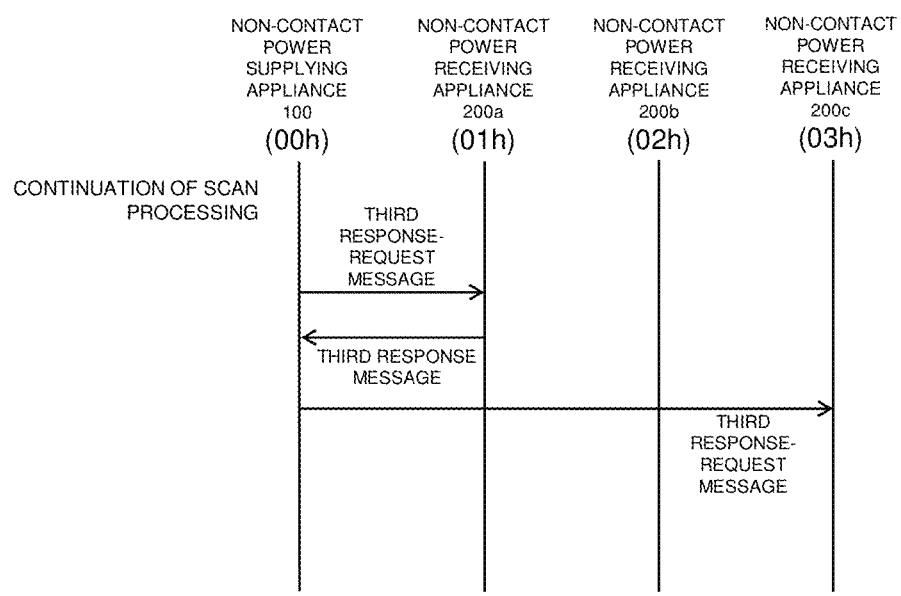
FIG. 13B is a diagram showing a communication sequence between a non-contact power supplying appliance and non-contact power receiving appliances in the situation shown in FIG. 13A.

FIG. 13A is a plan view schematically showing a situation of scan processing applied to the second column and the third column. FIG. 13B is a diagram showing a communication sequence between a non-contact power supplying appliance and non-contact power receiving appliances in the situation shown in FIG. 13A.

As shown in FIG. 13A, in process (D) of the scan processing, controller 2 controls power supply units 1 meshed in a grey color in the second column and the third column so as to supply power necessary to operate each communication unit 10 of non-contact power receiving appliances 200a, 200c.

As shown in FIG. 13B, controller 2 further sends a communication packet that stores a third response-request message, to communication address (01h) of non-contact power receiving appliance 200a and communication address (03h) of non-contact power receiving appliance 200c.

Because non-contact power receiving appliance 200a is placed on the second column and the third column, communication unit 10 of non-contact power receiving appliance 200a receives the power transmitted from power supply units 1 of the second column and the third column, and receives a third response-request message sent from communication unit 5.

On the other hand, because non-contact power receiving appliance 200c is placed neither on the second column nor on the third column, non-contact power receiving appliance 200c cannot receive power, does not receive a third response-request message, and does not send a third response message.

In non-contact power receiving appliance 200a, when communication unit 10 receives a third response-request message, controller 11 controls communication unit 10 to send a magnitude of the power detected by power measuring unit 12, as a third response message.

In non-contact power supplying appliance 100, when communication unit 5 receives a third response message, in process (E) of the scan processing, controller 2 stores in storage unit 6, communication address (01h) of non-contact power receiving appliance 200a and a magnitude of the power under reception.

In non-contact power receiving appliance 200a, a magnitude of the power detected by power measuring unit 12 becomes larger in the situation shown in FIG. 13A than that in the situation shown in FIG. 12A. Therefore, in process (F) of the scan processing, controller 2 can identify a row in which a magnitude of the power received by non-contact power receiving appliance 200a becomes largest, and can recognize that non-contact power receiving appliance 200a is placed on the second column and the third column.

As a result of the above scan processing, controller 2 understands that non-contact power receiving appliance 200a is placed on the second column, the third column of the fifth row, sixth row, and stores a combination of non-contact power receiving appliance 200a and some of power supply units 1, in storage unit 6.

Figure 14A:
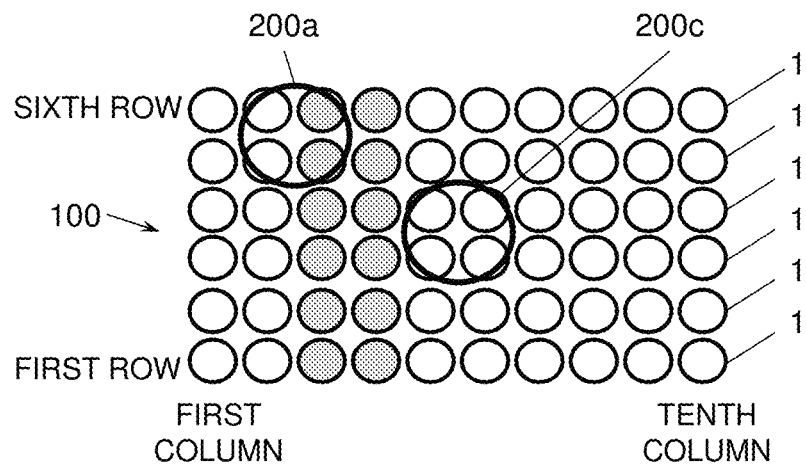
FIG. 14A is a plan view schematically showing a situation of scan processing.
Figure 14B:
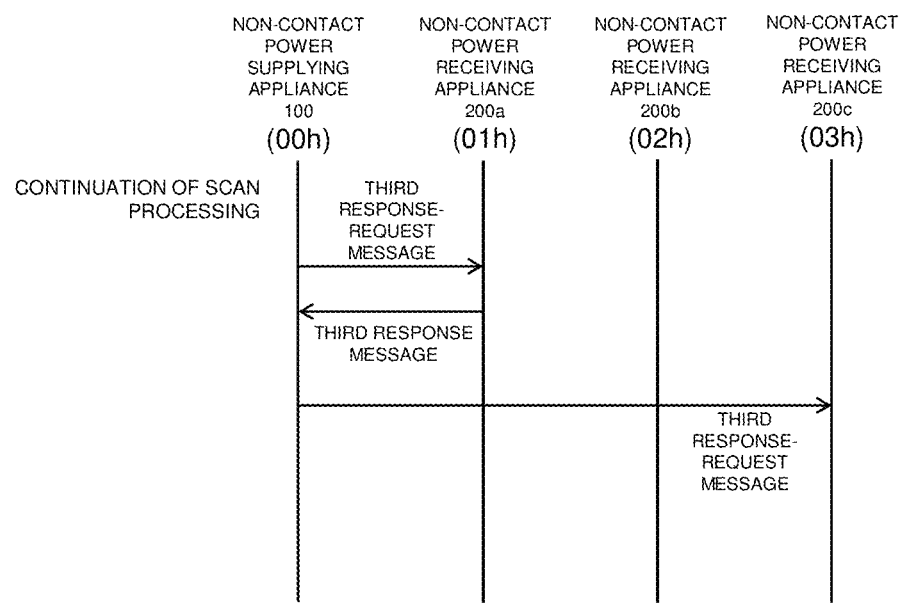
FIG. 14B is a diagram showing a communication sequence between a non-contact power supplying appliance and non-contact power receiving appliances in the situation shown in FIG. 14A.

FIG. 14A is a plan view schematically showing a situation of scan processing applied to the third column and the fourth column. FIG. 14B is a diagram showing a communication sequence between a non-contact power supplying appliance and non-contact power receiving appliances in the situation shown in FIG. 14A.

As shown in FIG. 14A, in process (D) of the scan processing, controller 2 controls power supply units 1 meshed in a grey color in the third column and the fourth column so as to supply power necessary to operate communication unit 10 of non-contact power receiving appliance 200c of which a placement location is not identified.

As shown in FIG. 14B, controller 2 further controls communication unit 5 so as to send a communication packet that stores a third response-request message, to communication address (03h) of non-contact power receiving appliance 200c.

After identifying a placement location of non-contact power receiving appliance 200a by the scan processing to the first column to the third column, controller 2 thereafter can execute scan processing for only identifying a placement location of non-contact power receiving appliance 200c.

That is, because it is clear that non-contact power receiving appliance 200c is placed on the fourth row and the fifth row, controller 2 may operate only power supply units 1 of the fourth row and the fifth row, after identifying a placement location of non-contact power receiving appliance 200a. Accordingly, energy saving performance of non-contact power supplying appliance 100 can be improved.

On the other hand, because non-contact power receiving appliance 200c is placed neither on the third column nor on the fourth column, non-contact power receiving appliance 200c cannot receive power, does not receive a third response-request message, and does not send a third response message.

Figure 15A:
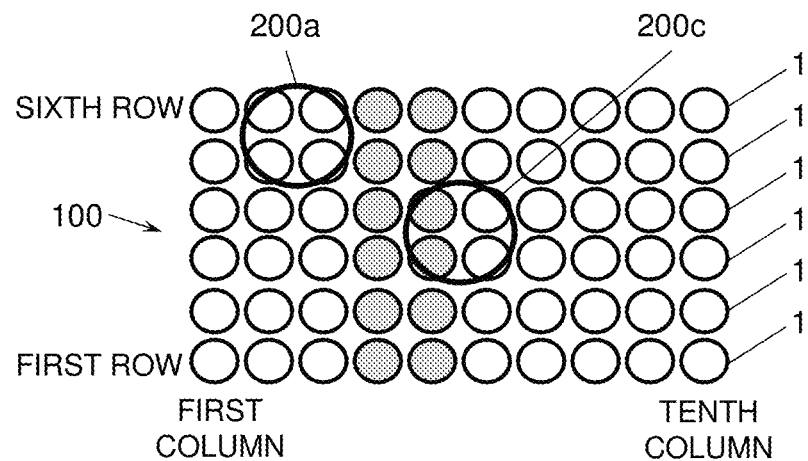
FIG. 15A is a plan view schematically showing a situation of scan processing.
Figure 15B:
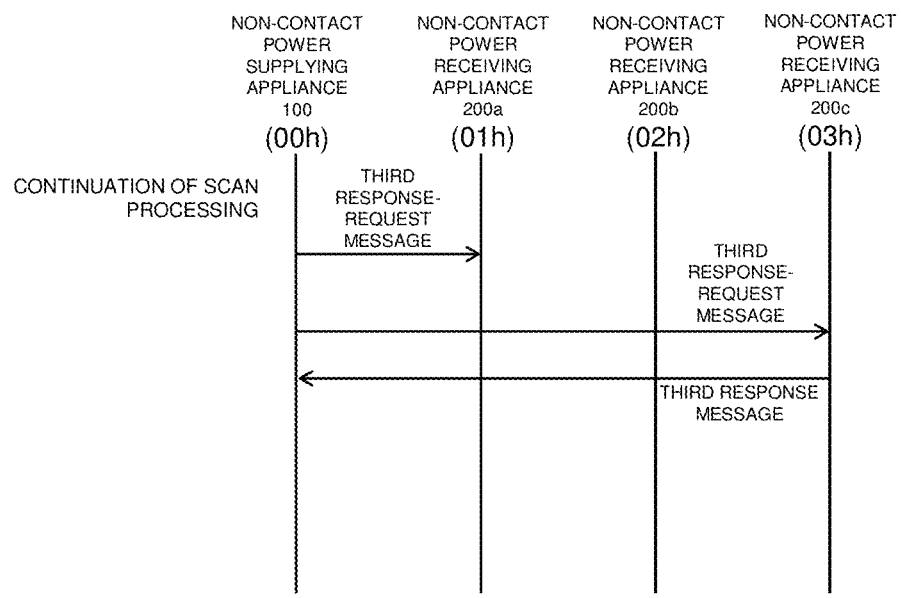
FIG. 15B is a diagram showing a communication sequence between a non-contact power supplying appliance and non-contact power receiving appliances in the situation shown in FIG. 15A.

FIG. 15A is a plan view schematically showing a situation of scan processing applied to the fourth column and the fifth column. FIG. 15B is a diagram showing a communication sequence between a non-contact power supplying appliance and non-contact power receiving appliances in the situation shown in FIG. 15A.

As shown in FIG. 15A, in process (D) of the scan processing, controller 2 controls power supply units 1 meshed in a grey color in the fourth column and the fifth column so as to supply power necessary to operate communication unit 10 of non-contact power receiving appliance 200c.

As shown in FIG. 15B, controller 2 further controls communication unit 5 so as to send a communication packet that stores a third response-request message, to communication address (03h) of non-contact power receiving appliance 200c.

Because non-contact power receiving appliance 200c is placed on the fifth column and the sixth column, communication unit 10 of non-contact power receiving appliance 200c receives power transmitted from power supply unit 1 of the fifth column, and receives a third response message sent from communication unit 5.

In non-contact power receiving appliance 200c, upon receiving a third response-request message, controller 11 controls communication unit 10 to send a magnitude of the power detected by power measuring unit 12 to non-contact power supplying appliance 100 as a third response message.

In non-contact power supplying appliance 100, when communication unit 10 receives a third response message, in process (E) of the scan processing, controller 2 stores in storage unit 6, communication address (01h) of non-contact power receiving appliance 200c and a magnitude of the power under reception.

Figure 16A:
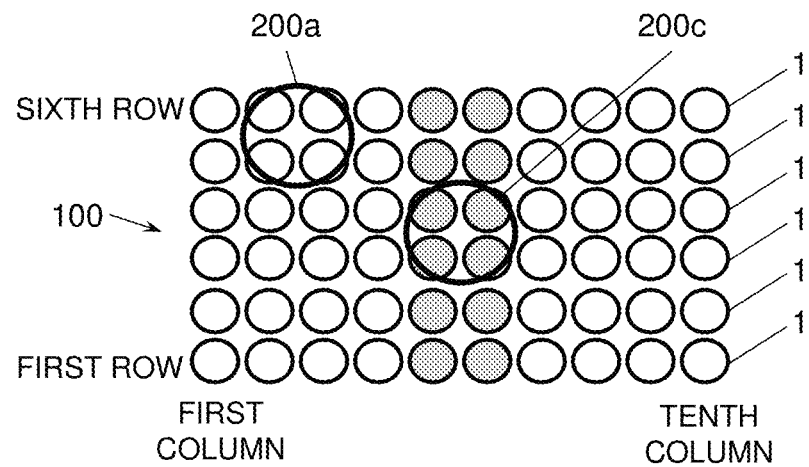
FIG. 16A is a plan view schematically showing a situation of scan processing.
Figure 16B:
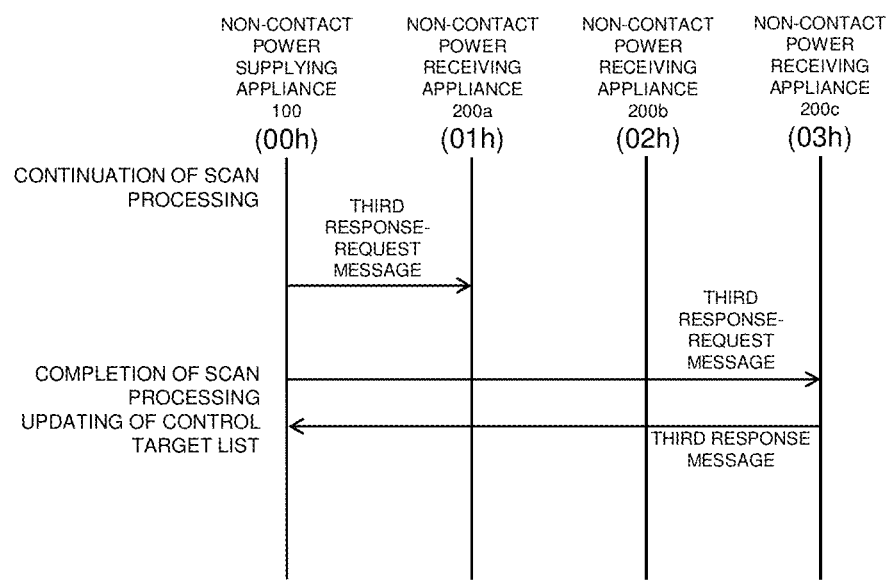
FIG. 16B is a diagram showing a communication sequence between a non-contact power supplying appliance and non-contact power receiving appliances in the situation shown in FIG. 16A.

FIG. 16A is a plan view schematically showing a situation of scan processing applied to the fifth column and the sixth column. FIG. 16B is a diagram showing a communication sequence between a non-contact power supplying appliance and non-contact power receiving appliances in the situation shown in FIG. 16A.

As shown in FIG. 16A, in process (D) of the scan processing, controller 2 controls power supply units 1 meshed in a grey color in the fifth column and the sixth column so as to supply power necessary to operate communication unit 10 of non-contact power receiving appliance 200c.

Controller 2 further sends a communication packet that stores a third response-request message, to communication address (03h) of non-contact power receiving appliance 200c.

Because non-contact power receiving appliance 200c is placed on the fifth column and the sixth column, communication unit 10 of non-contact power receiving appliance 200c receives power transmitted from power supply units 1 of the fifth column and the sixth column, and receives a third response-request message sent from communication unit 5.

In non-contact power receiving appliance 200c, when communication unit 10 receives a third response-request message, controller 11 controls communication unit 10 to send a magnitude of the power detected by power measuring unit 12, as a third response message.

In non-contact power supplying appliance 100, when communication unit 5 receives a third response message, in process (E) of the scan processing, controller 2 stores in storage unit 6, communication address (03h) of non-contact power receiving appliance 200c and a magnitude of the power under reception.

In non-contact power receiving appliance 200c, a magnitude of the power detected by power measuring unit 12 becomes larger in the situation shown in FIG. 16A than that in the situation shown in FIG. 15A. Therefore, in process (F) of the scan processing, controller 2 can identify a row in which a magnitude of the power received by non-contact power receiving appliance 200c becomes largest, and can recognize that non-contact power receiving appliance 200c is placed on the fifth column and the sixth column.

As a result of the above scan processing, controller 2 understands that non-contact power receiving appliance 200c is placed on the fifth column, the sixth column of the third row, the fourth row, and stores a combination of non-contact power receiving appliance 200c and some of power supply units 1, in storage unit 6.

When controller 2 ends identifying combinations of all non-contact power receiving appliances 200 detected in placement detection state 15 and some of power supply units 1, non-contact power supplying appliance 100 transits from scan processing state 16 to registration state 17.

In registration state 17, identified non-contact power receiving appliances 200 are registered as power transmission targets, in a control target list held by storage unit 6. When the control target list is updated, registration state 17 ends, and non-contact power supplying appliance 100 and non-contact power receiving appliance 200 transit to power supply state 18.

Power Supply Operation

Next, power supply state 18 in the present exemplary embodiment will be described with reference to FIG. 17A and FIG. 17B.

Figure 17A:
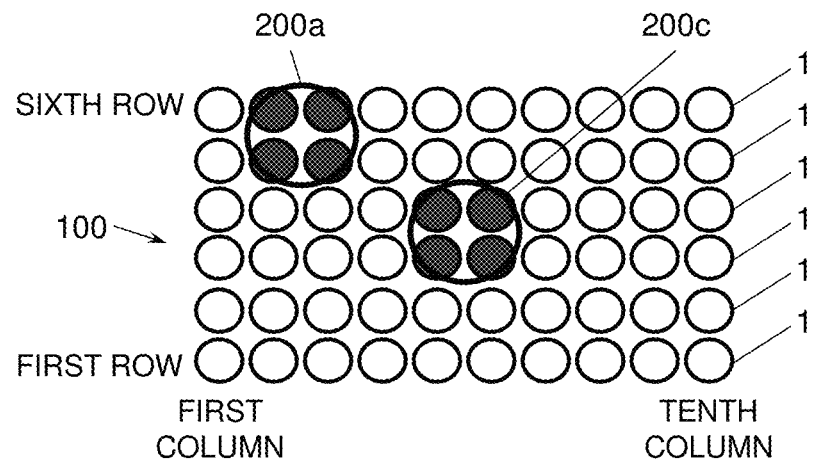
FIG. 17A is a plan view schematically showing a situation that a non-contact power receiving appliance receives power.
Figure 17B:
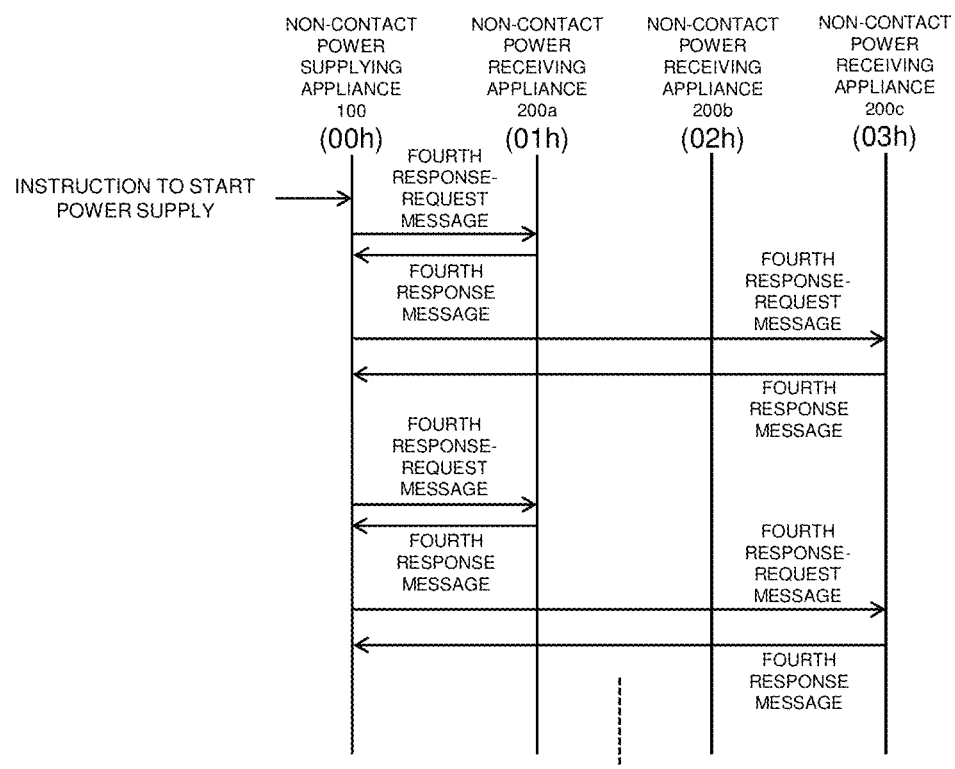
FIG. 17B is a diagram showing a communication sequence between a non-contact power supplying appliance and non-contact power receiving appliances in the situation shown in FIG. 17A.

FIG. 17A is a plan view schematically showing a situation that non-contact power receiving appliances 200a, 200c receive power. FIG. 17B is a diagram showing a communication sequence between a non-contact power supplying appliance and non-contact power receiving appliances in the situation shown in FIG. 17A.

Upon receiving an instruction to start power supply, controller 2 controls power supply units 1 combined with non-contact power receiving appliance 200 registered in the control target list so as to supply the same power as rated power of load 7 of non-contact power receiving appliance 200 registered in initial registration state 14, to non-contact power receiving appliance 200 detected in scan processing state 16 and registered in a control target list in registration state 17.

Controller 2 controls communication unit 5 so as to periodically send a fourth response-request message for controlling power transmitted. In non-contact power receiving appliance 200, when communication unit 10 receives a fourth response-request message, controller 11 controls communication unit 10 to send a communication packet that stores a power error as a fourth response message corresponding to a fourth response-request message.

In non-contact power supplying appliance 100, when communication unit 5 receives a fourth response message, controller 2 controls power supply units 1 combined with non-contact power receiving appliance 200 that has sent a fourth response message, so that a power error becomes zero, in non-contact power receiving appliance 200 that has sent the fourth response message.

Specifically, as shown in FIG. 17A, non-contact power receiving appliances 200a, 200c are detected, in placement detection state 15. In scan processing state 16, it is identified that non-contact power receiving appliance 200a is combined with four power supply units 1 meshed in a grey color on the second column and the third column of the fifth row and the sixth row. It is identified that non-contact power receiving appliance 200c is combined with four power supply units 1 meshed in a grey color on the fifth column and the sixth column of the third row and the fourth row.

Thereafter, when non-contact power receiving appliances 200a, 200c are registered in the control target list, controller 2 controls power supply units 1 combined with non-contact power receiving appliance 200a, to supply the same power as the rated power of load 7 of non-contact power receiving appliance 200a registered in initial registration state 14, to load 7 of non-contact power receiving appliance 200a.

Controller 2 further controls power supply units 1 combined with non-contact power receiving appliance 200c, to supply the same power as the rated power of load 7 of non-contact power receiving appliance 200c registered in initial registration state 14, to load 7 of non-contact power receiving appliance 200c.

Controller 2 controls communication unit 5 so as to periodically send a fourth response-request message to each communication unit 10 of non-contact power receiving appliances 200a, 200c.

In non-contact power receiving appliance 200a, when communication unit 10 receives a fourth response-request message, controller 11 controls communication unit 10 to send a communication packet that stores a power error as a fourth response message.

In a similar manner to that in non-contact power receiving appliance 200a, in non-contact power receiving appliance 200c, when communication unit 5 receives a fourth response-request message, controller 11 controls communication unit 10 so as to send a communication packet that stores a power error as a fourth response message.

When communication unit 5 receives two fourth response messages sent from non-contact power receiving appliances 200a, 200c, controller 2 controls power supply units 1 combined with non-contact power receiving appliances 200a, 200c so as to set power errors stored in the two fourth response messages to zero.

As described above, in the present exemplary embodiment, by using one communication unit 5 to communicate with a plurality of non-contact power receiving appliances 200, non-contact power supplying appliance 100 can be configured in a practicable scale.

Further, in the present exemplary embodiment, after scan processing in a row direction in process (A) to process (C), scan processing in a column direction is implemented in process (D) to process (F). However, an implementation order may be set opposite.

In the present exemplary embodiment, scan processing is started from the first row and the first column. However, scan processing may be started from an n-th row and an m-th column.

In the present exemplary embodiment, controller 2 sets 2, as the numbers of rows and columns to which scan processing is executed simultaneously. However, without limiting the setting to this method, controller 2 may determine the numbers of rows and columns to which scan processing is executed simultaneously, in accordance with diameters of coils included in resonance circuits 8.

When a plurality of non-contact power receiving appliances 200 having different diameters of coils included in resonance circuits 8 are placed, scan processing may be carried out individually.

As a concrete example, the following case will be described. In this case, for example, a diameter of a coil included in resonance circuit 8 of non-contact power receiving appliance 200a corresponds to a size for one power supply unit 1, and a diameter of each coil included in each resonance circuit 8 of non-contact power receiving appliances 200b, 200c corresponds to a size for three power supply units 1.

First, in order to identify a combination of non-contact power receiving appliance 200a and some of power supply units 1, process (A) to process (F) of the scan processing is executed, by setting 1 as the numbers of rows and columns to which scan processing is carried out.

Thereafter, in order to identify a combination of non-contact power receiving appliance 200b and some of power supply units 1 and a combination of non-contact power receiving appliance 200c and some of power supply units 1, process (A) to process (F) of the scan processing is executed, by setting 3 as the numbers of rows and columns to which scan processing is carried out.

When all resonance circuits 8 of placed non-contact power receiving appliances 200 include coils of diameters corresponding to a size of one power supply unit 1, a magnitude of the power received by a power receiving side in the scan is identified as one kind. Therefore, it is not necessary that the power receiving side sends a magnitude of the power under reception as a response message and a power supply side stores the response message. Accordingly, in this case, a system specification may be that only reception of power is transmitted as a response message.

When a power-receiving side communication unit has a MAC (medium access control) function having collision avoiding means such as CSMA (Carrier Sense Multiple Access), it is possible to provide a configuration for each power receiving appliance to send a response message in response to one response-request message in order while avoiding collision.

Therefore, even when an address of a placed non-contact power receiving appliance is not known in advance, a non-contact power supplying appliance may send a response-request message by broadcast, and the non-contact power receiving appliance may send a response message in response to this response-request message. In this case, an address of the non-contact power receiving appliance is not required to be initially registered in advance.

Moving of Non-contact Power Receiving Appliance

Hereinafter, an operation in the present exemplary embodiment when a non-contact power receiving appliance is moved will be described with reference to FIG. 18A to FIG. 25B.

Figure 18A:
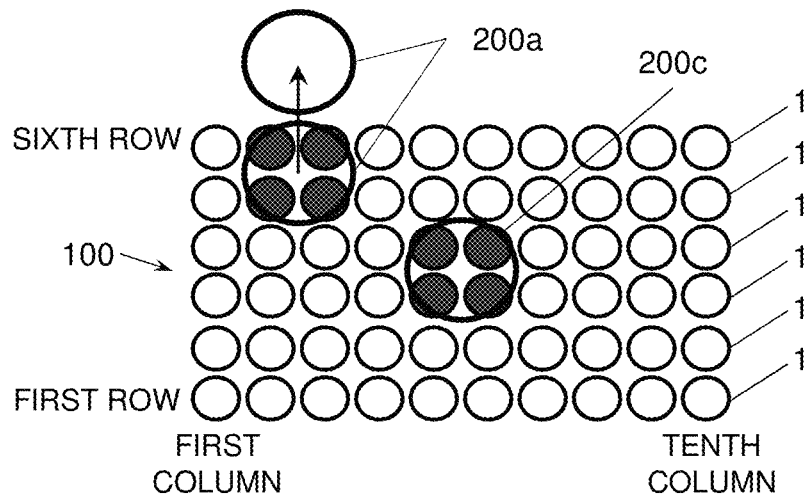
FIG. 18A is a plan view schematically showing a situation that a non-contact power receiving appliance that is receiving power is removed from above a non-contact power supplying appliance.
Figure 18B:
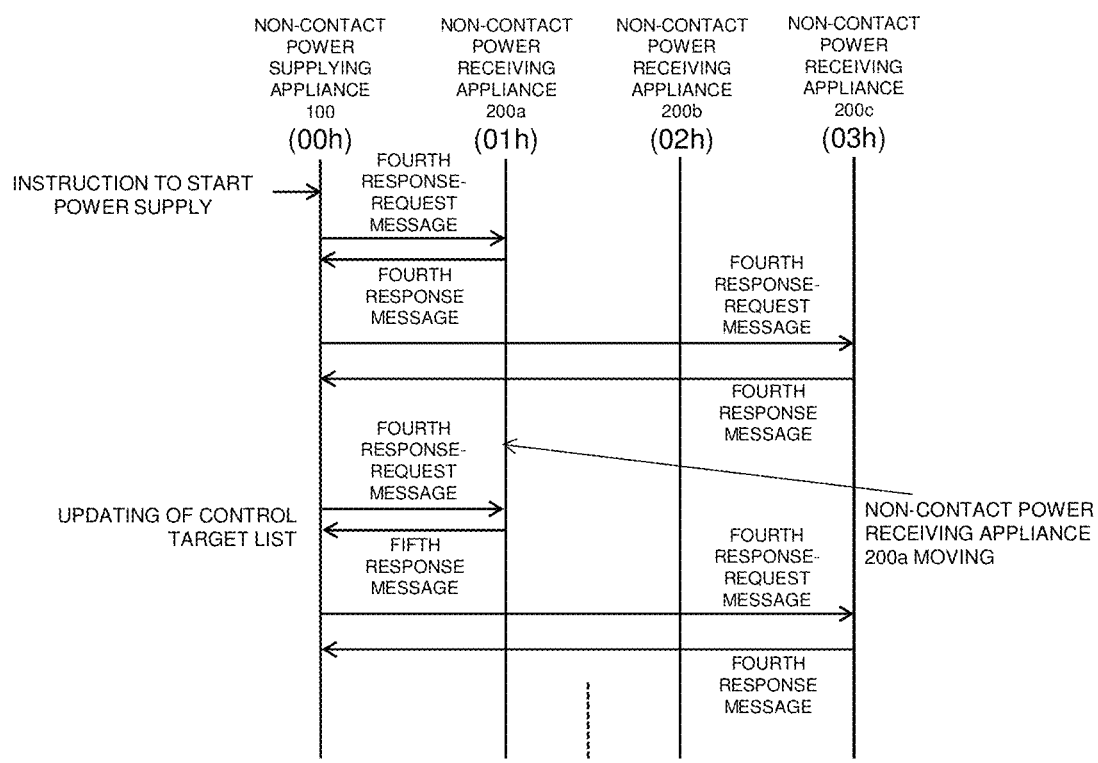
FIG. 18B is a diagram showing a communication sequence between a non-contact power supplying appliance and non-contact power receiving appliances in the situation shown in FIG. 18A.

FIG. 18A is a plan view schematically showing a situation that during power transmission to non-contact power receiving appliances 200a, 200c, non-contact power receiving appliance 200a is removed from above non-contact power supplying appliance 100. FIG. 18B is a diagram showing a communication sequence between a non-contact power supplying appliance and a non-contact power receiving appliance in the situation shown in FIG. 18A.

Non-contact power receiving appliance 200 includes on its bottom a push switch (not shown) as a switching unit that switches whether to supply power to load 7. The push switch is configured to be closed when non-contact power receiving appliance 200 is placed on non-contact power supplying appliance 100, and opened when non-contact power receiving appliance 200a is lifted for the sake of moving or the like.

When the push switch is opened, in response to a fourth response-request message, controller 11 controls communication unit 10 to send a communication packet that stores a fifth response message indicating that non-contact power receiving appliance 200a has moved.

In non-contact power supplying appliance 100, when communication unit 5 receives a communication packet including a fifth response message, controller 2 stops power transmission to non-contact power receiving appliance 200a, and deletes information of non-contact power receiving appliance 200a from the control target list in order to remove non-contact power receiving appliance 200a from the power transmission targets.

Further, when controller 2 does not receive a fourth response message during a predetermined period from non-contact power receiving appliance 200a for some reason after communication unit 5 sends a fourth response-request message to non-contact power receiving appliance 200a, controller 2 also similarly stops power transmission to non-contact power receiving appliance 200a, and deletes information of non-contact power receiving appliance 200a from the control target list in order to remove non-contact power receiving appliance 200a from the power transmission targets.

Figure 19A:
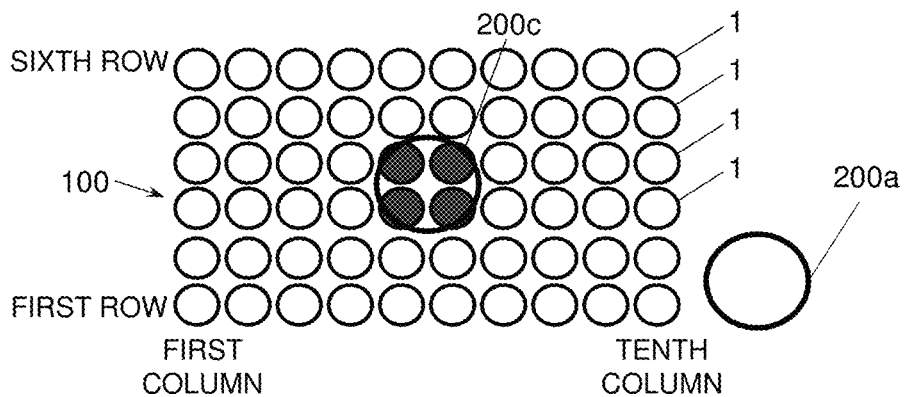
FIG. 19A is a plan view schematically showing a situation that a non-contact power receiving appliance has moved to a position where power cannot be received.
Figure 19B:
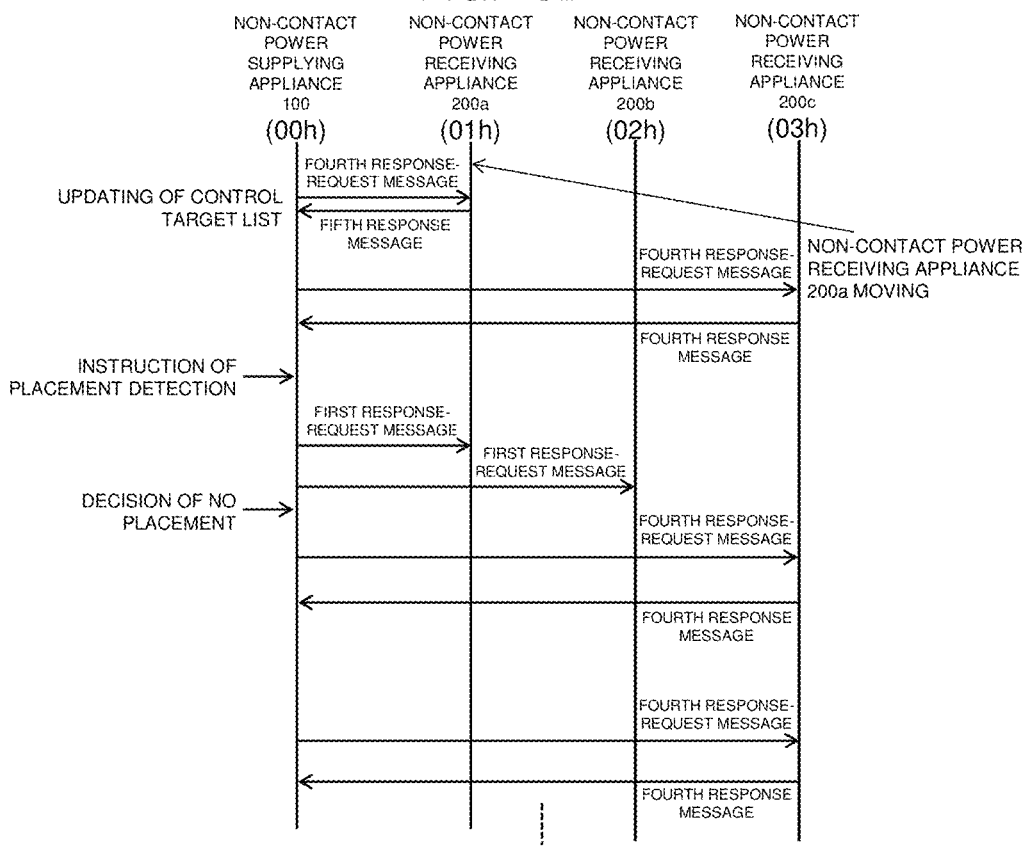
FIG. 19B is a diagram showing a communication sequence between a non-contact power supplying appliance and non-contact power receiving appliances in placement detection shown in FIG. 19A.

FIG. 19A is a plan view schematically showing a situation that a non-contact power receiving appliance has moved to a position where power cannot be received. FIG. 19B is a diagram showing a communication sequence between a non-contact power supplying appliance and non-contact power receiving appliances in the situation shown in FIG. 19A.

As shown in FIG. 19A and FIG. 19B, non-contact power supplying appliance 100 attempts to detect non-contact power receiving appliance 200a in placement detection state 15.

Specifically, controller 2 controls all power supply units 1 that are not in power supply state 18 so as to supply power necessary to operate communication units 10 of non-contact power receiving appliances 200 that are registered in initial registration state 14. Controller 2 further controls communication unit 5 so as to send a communication packet that stores a first response-request message, to communication addresses of non-contact power receiving appliances 200 that are registered in initial registration state 14.

However, non-contact power receiving appliance 200a does not receive a first response-request message, and therefore, does not send a first response message. When a first response message is not received within a predetermined period, controller 2 decides that "there is no placement detection", and continues only power transmission to non-contact power receiving appliance 200c.

FIG. 20A is a plan view schematically showing a situation that non-contact power receiving appliance 200a is placed on the ninth column, tenth column of the first row, second row of non-contact power supplying appliance 100. FIG. 20B is a diagram showing a communication sequence between a non-contact power supplying appliance and non-contact power receiving appliances in the situation shown in FIG. 20A.

As shown in FIG. 20A and FIG. 20B, non-contact power supplying appliance 100 attempts to detect non-contact power receiving appliance 200a in placement detection state 15.

Specifically, controller 2 controls all power supply units 1 that are not in power supply state 18 so as to supply power necessary to operate communication units 10 of non-contact power receiving appliances 200 that are registered in initial registration state 14. Controller 2 further controls communication unit 5 so as to send a communication packet that stores a first response-request message, to communication addresses of non-contact power receiving appliances 200 that are registered in initial registration state 14.

In non-contact power receiving appliance 200a, when communication unit 10 receives a first response-request message, controller 11 controls communication unit 10 to send a communication packet that stores a magnitude of the power measured by power measuring unit 12, as a first response message.

Figure 21A:
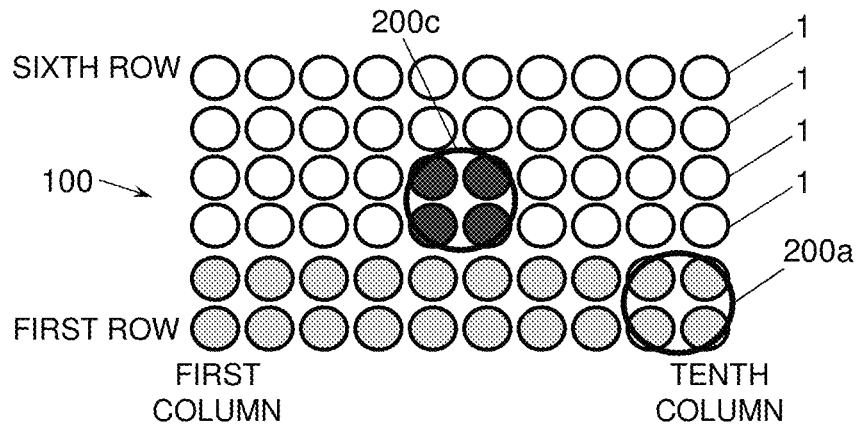
FIG. 21A is a plan view schematically showing a situation of scan processing applied to a non-contact power receiving appliance after moving.
Figure 21B:
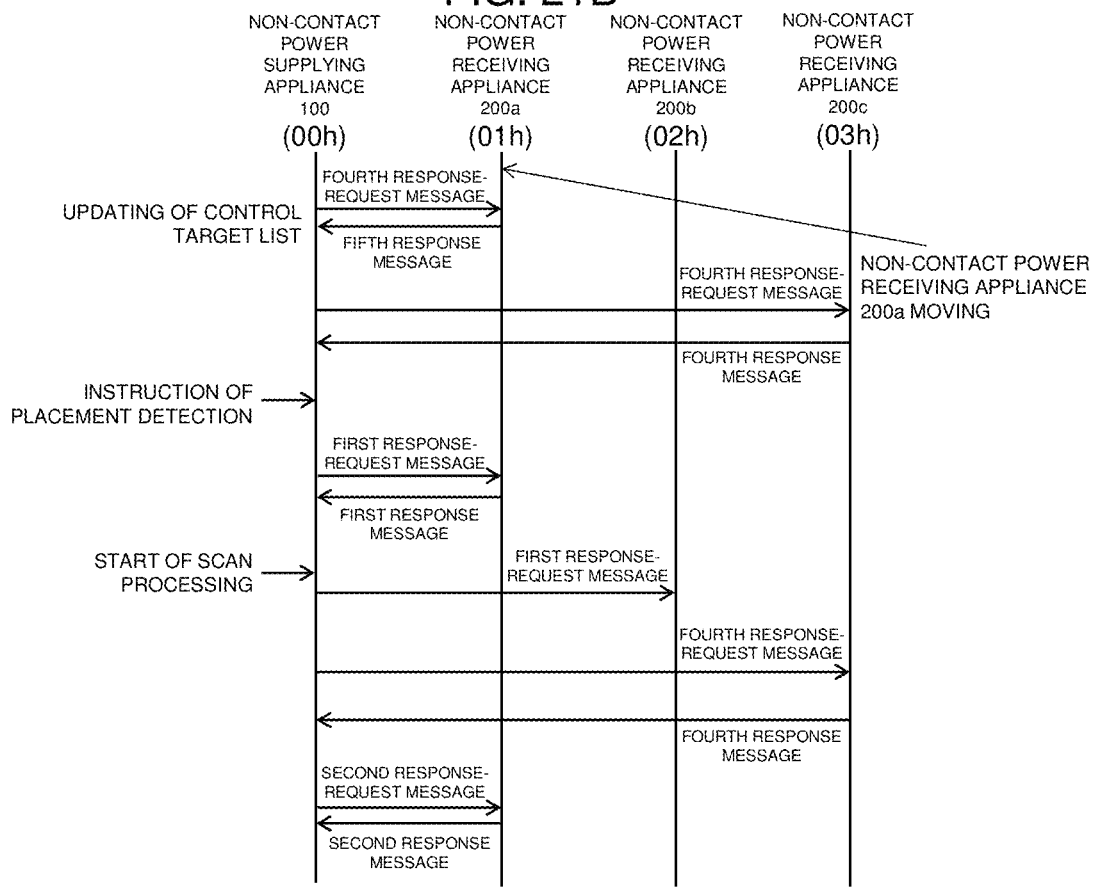
FIG. 21B is a diagram showing a communication sequence between a non-contact power supplying appliance and non-contact power receiving appliances in scan processing after moving shown in FIG. 21A.
Figure 22A:
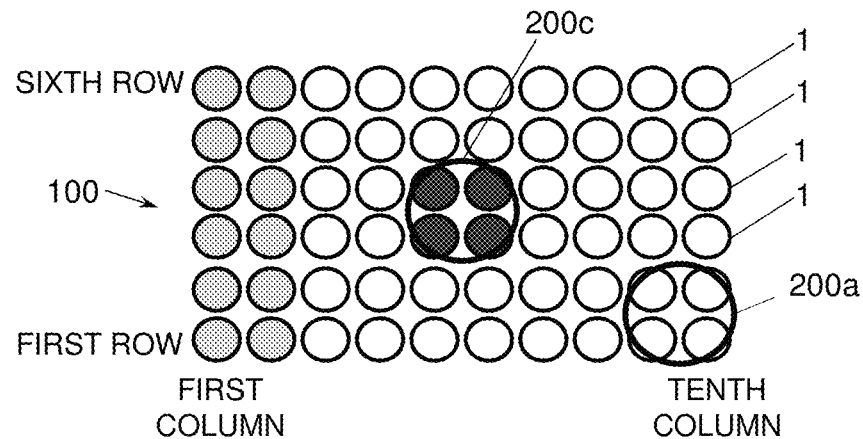
FIG. 22A is a plan view schematically showing a situation of scan processing applied to a non-contact power receiving appliance after moving.
Figure 22B:
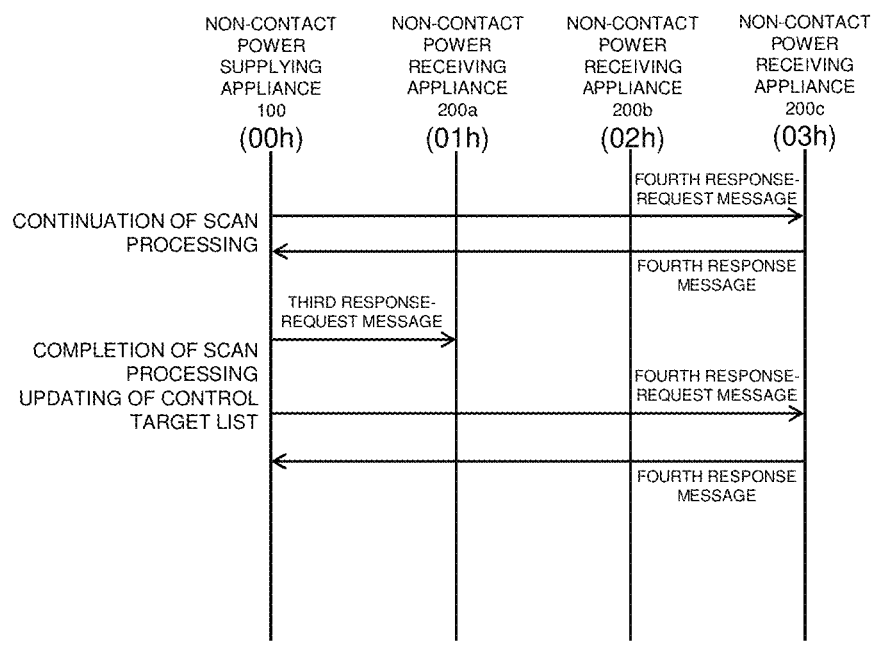
FIG. 22B is a diagram showing a communication sequence between a non-contact power supplying appliance and non-contact power receiving appliances in scan processing after moving shown in FIG. 22A.
Figure 23A:
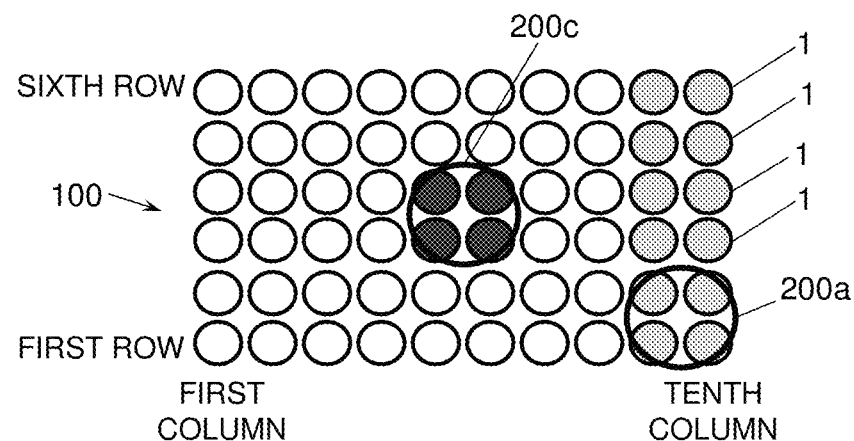
FIG. 23A is a plan view schematically showing a situation of scan processing applied to a non-contact power receiving appliance after moving.
Figure 23B:
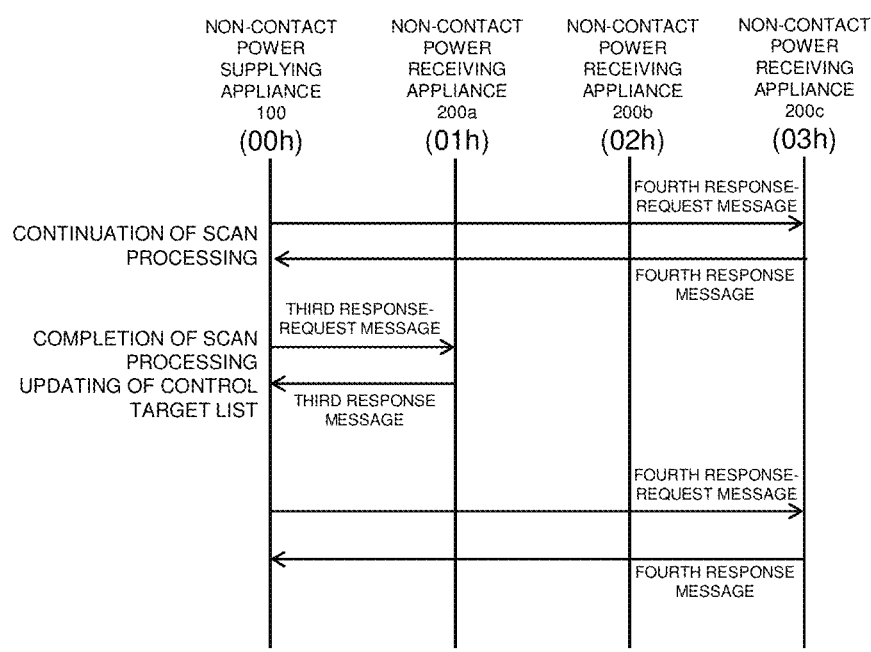
FIG. 23B is a diagram showing a communication sequence between a non-contact power supplying appliance and non-contact power receiving appliances in scan processing after moving shown in FIG. 23A.

FIG. 21A, FIG. 22A, FIG. 23A are plan views schematically showing a situation of scan processing applied to non-contact power receiving appliance 200a after moving. FIG. 21B, FIG. 22B, FIG. 23B are diagrams showing a communication sequence between a non-contact power supplying appliance and non-contact power receiving appliances in the situation shown in FIG. 21A, FIG. 22A, FIG. 23B.

Figure 24A:
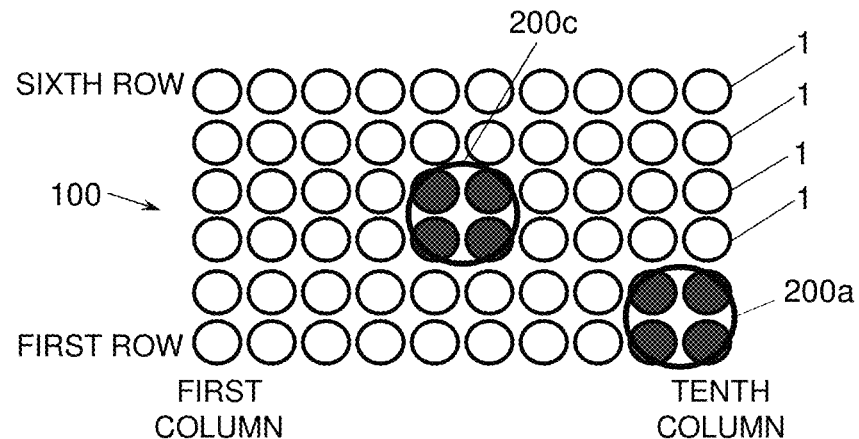
FIG. 24A is a plan view schematically showing a situation that non-contact power receiving appliance after moving receives power.
Figure 24B:
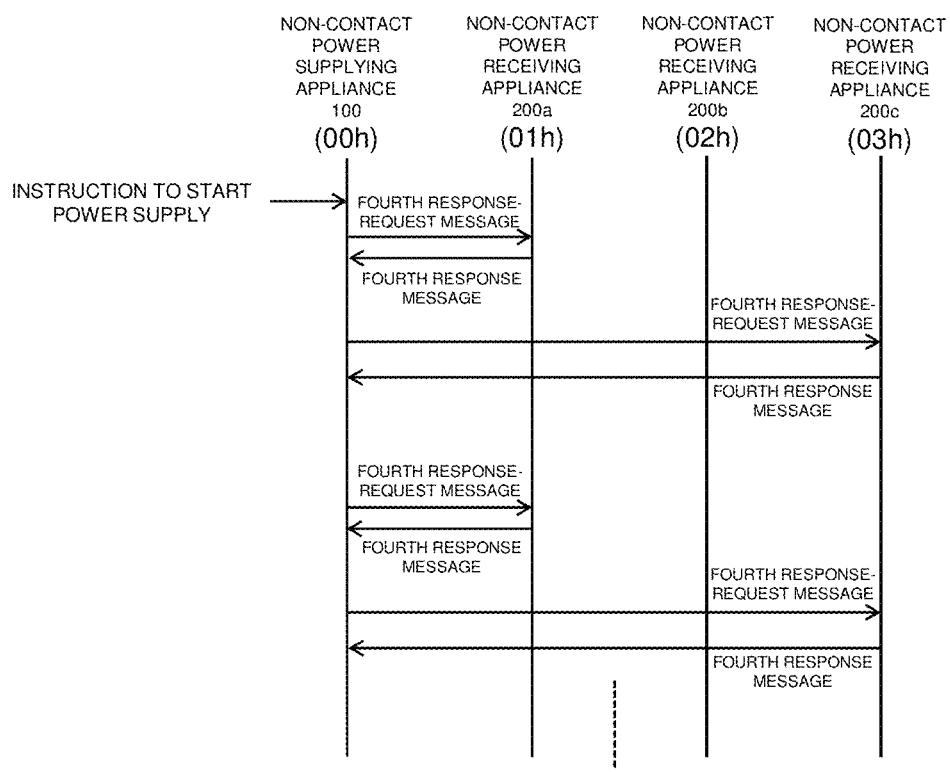
FIG. 24B is a diagram showing a communication sequence between a non-contact power supplying appliance and non-contact power receiving appliances in the situation shown in FIG. 24A.

FIG. 24A is a plan view schematically showing a situation that non-contact power receiving appliances 200a, 200c after moving receive power. FIG. 24B is a diagram showing a communication sequence between a non-contact power supplying appliance and non-contact power receiving appliances in the situation shown in FIG. 24A.

The scan processing sown in FIG. 21A to FIG. 23B is similar to the scan processing shown in FIG. 7A to FIG. 16B. The power supply operation shown in FIG. 24A, FIG. 24B are similar to the power supply operation shown in FIG. 17A, FIG. 17B. Therefore, a description of the scan processing and the power supply operation will be omitted here.

Figure 25A:
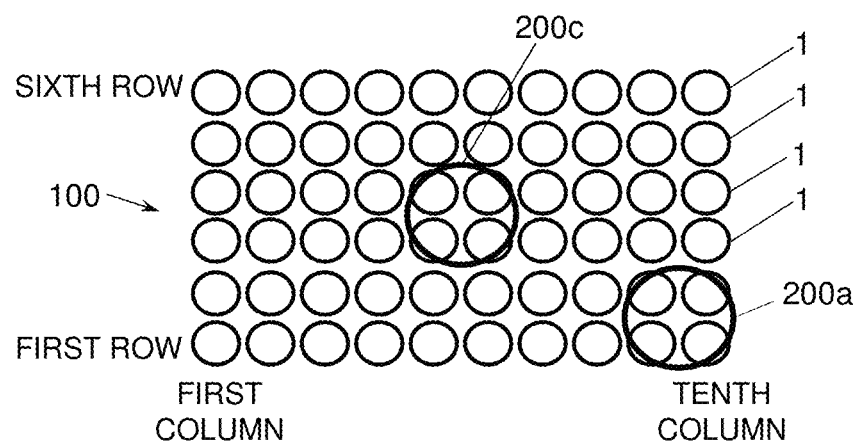
FIG. 25A is a plan view schematically showing an end of power transmission to a non-contact power receiving appliance after moving.
Figure 25B:
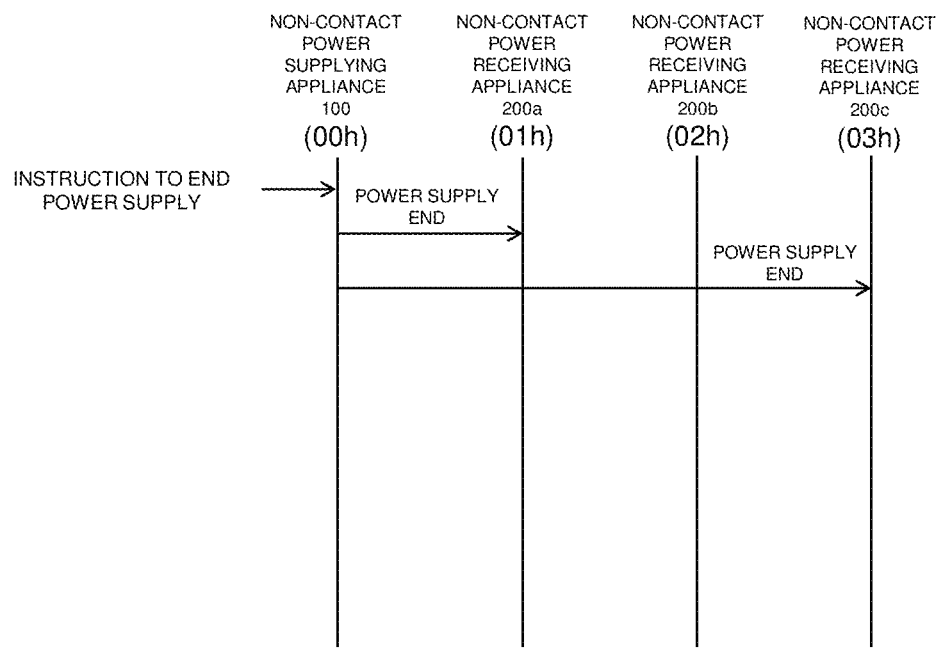
FIG. 25B is a diagram showing a communication sequence between a non-contact power supplying appliance and non-contact power receiving appliances in the situation shown in FIG. 25A.

FIG. 25A is a plan view schematically showing an end of power supply operation to non-contact power receiving appliance 200a after moving. FIG. 25B is a diagram showing a communication sequence between a non-contact power supplying appliance and non-contact power receiving appliances in the situation shown in FIG. 25A.

As shown in FIG. 25B, when the user instructs non-contact power receiving appliance 200a and non-contact power receiving appliance 200c to end power supply, in accordance with the instruction to end the power supply, controller 2 controls communication unit 5 so as to send a communication packet indicating the end of power supply to non-contact power receiving appliances 200a 200c, and controls power supply unit 1 so as to stop the power supply.

As described above, according to the present exemplary embodiment, in accordance with moving of non-contact power receiving appliance 200, non-contact power supplying appliance 100 can stop power transmission.

Second Exemplary Embodiment

Hereinafter, a second exemplary embodiment of the present disclosure will be described with reference to FIG. 26 to FIG. 28.

Figure 26:
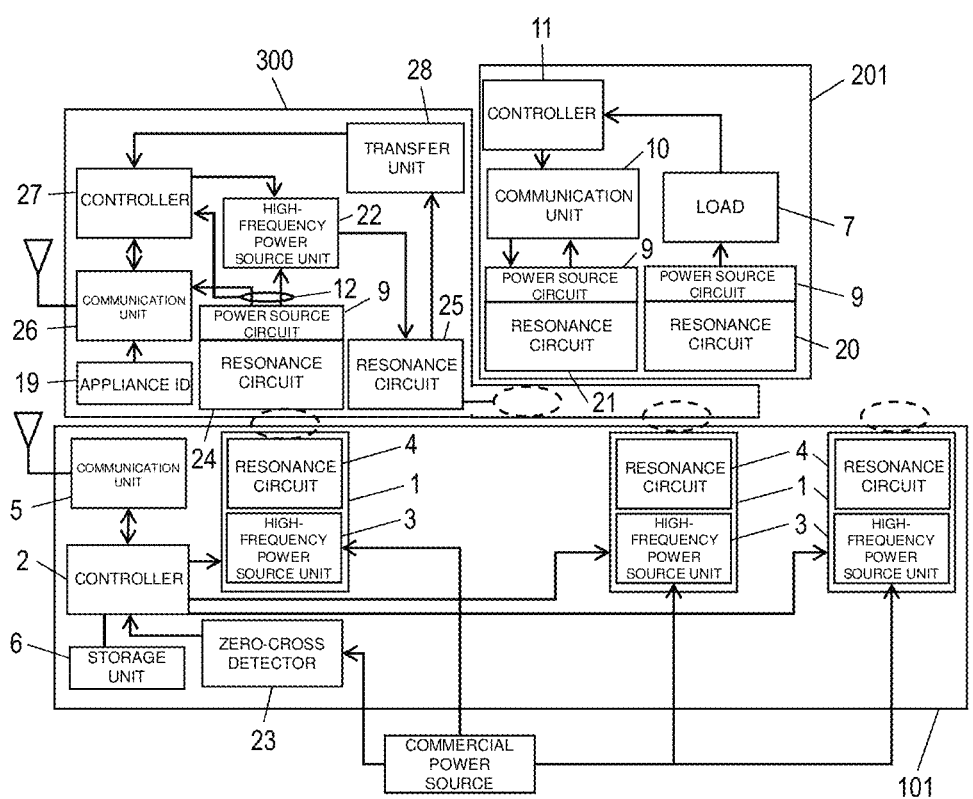
FIG. 26 is a block configuration diagram of a non-contact power supplying appliance, a non-contact power receiving appliance, and an adapter appliance according to a second exemplary embodiment.

FIG. 26 is a block configuration diagram of non-contact power supplying appliance 101, non-contact power receiving appliance 201, and adapter appliance 300 according to the present exemplary embodiment. FIG. 27 is a plan view schematically showing a state that adapter appliance 300 is placed on non-contact power supplying appliance 101.

Figure 27:
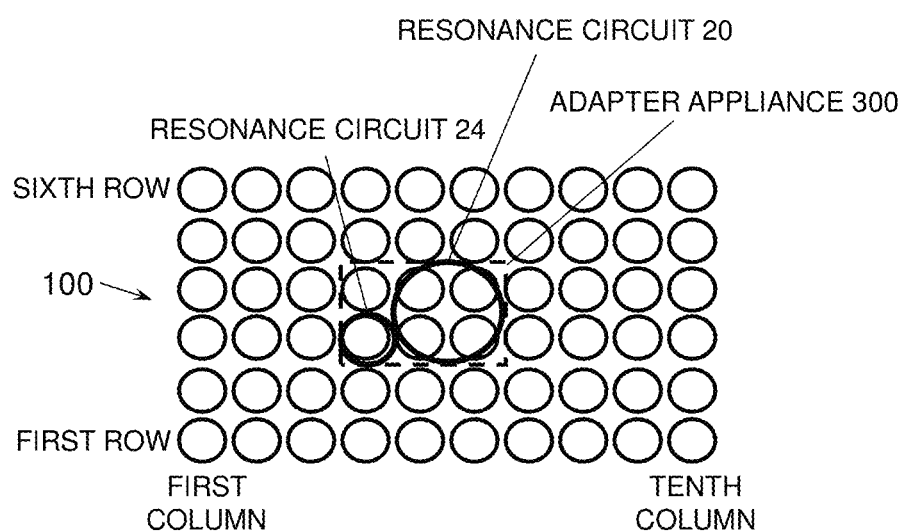
FIG. 27 is a plan view schematically showing a state that an adapter appliance is placed on a non-contact power supplying appliance in the second exemplary embodiment.

As shown in FIG. 26, FIG. 27, non-contact power supplying appliance 101 is an induction heating cooker having a plurality of power supply units 1 arranged in a matrix shape, in a similar manner to that of non-contact power supplying appliance 100 in the first exemplary embodiment. Non-contact power supplying appliance 101 has zero-cross detector 23 that detects a zero-cross point of a commercial power source and sends a zero-cross point timing to controller 2, in addition to the configuration of non-contact power supplying appliance 100.

Non-contact power receiving appliance 201 has resonance circuit 20 and resonance circuit 21, in a different manner from that of non-contact power receiving appliance 200 in the first exemplary embodiment.

Resonance circuit 20 receives larger power than that supplied to only load 7, from non-contact power supplying appliance 100. Resonance circuit 21 receives smaller power than that supplied to only communication unit 10, from non-contact power supplying appliance 101.

Communication unit 10 communicates with non-contact power supplying appliance 101 by superimposing a message on the power received, by load-modulating the power received via resonance circuit 21. That is, resonance circuit 21 is a power-receiving communication unit that receives power and sends and receives a communication packet.

According to the present exemplary embodiment, simplification of non-contact power receiving appliance 201 is possible. However, it is not rational that all power supply units 1 provided in non-contact power supplying appliance 101 have a communication function in a similar manner to that of the configuration of non-contact power receiving appliance 201.

Therefore, in the present exemplary embodiment, for non-contact power supplying appliance 101 to communicate with non-contact power receiving appliance 201 of the above configuration, adapter appliance 300 is newly provided.

In general, when power consumption exceeds 1 kW, it is difficult to superimpose appliance information on power to be transmitted. Therefore, it is necessary to provide a communication resonance circuit separately from a power-supplying resonance circuit. When a power supply frequency is close to a communication frequency, there is a possibility that communication can be carried out only near a zero-cross point during power supply.

As shown in FIG. 26, adapter appliance 300 includes resonance circuit 24, high-frequency power source unit 22, resonance circuit 25, communication unit 26, controller 27, transfer unit 28, and appliance ID 19.

Resonance circuit 24 is an adapter-side power receiving unit that contactlessly receives power from power supply unit 1 of non-contact power supplying appliance 101. High-frequency power source unit 22 receives power via resonance circuit 24 and power source circuit 9, and generates high-frequency power.

Resonance circuit 25 communicates with non-contact power receiving appliance 201, by transmitting power supplied from high-frequency power source unit 22 to resonance circuit 21 of non-contact power receiving appliance 201 and by receiving information superimposed on power to be transmitted, from resonance circuit 21. That is, resonance circuit 25 is a power-supply communication unit that transmits power and sends and receives a communication packet.

Communication unit 26 is an adapter-side communication unit that communicates with communication unit 5 of non-contact power supplying appliance 101. Controller 27 is an adapter-side controller that controls resonance circuit 25 via high-frequency power source unit 22 and controls communication unit 26. Transfer unit 28 transfers to controller 27, appliance information of non-contact power receiving appliance 201 superimposed on power transmitted from resonance circuit 25 to resonance circuit 21.

In a similar manner to that of non-contact power receiving appliance 200 in the first exemplary embodiment, appliance ID 19 is initially registered in storage unit 6 of non-contact power supplying appliance 101 as IDa. When placement of adapter appliance 300 on non-contact power supplying appliance 101 is detected, adapter appliance 300 contactlessly receives power from power supply unit 1 via resonance circuit 24. This power is controlled in accordance with information communicated between communication unit 5 and communication unit 26.

Resonance circuit 25 is provided close to resonance circuit 21, and power contactlessly transmitted from resonance circuit 25 to resonance circuit 21 is supplied to communication unit 10 of non-contact power receiving appliance 201.

Controller 11 of non-contact power receiving appliance 201 load-modulates the contactlessly transmitted power by using power source circuit 9, and controls communication unit 10 so as to transmit the power to adapter appliance 300 by superimposing a message for power control on the power transmitted.

In adapter appliance 300, transfer unit 28 receives the message from non-contact power receiving appliance 201, and transfers the message to controller 27.

Resonance circuit 20 of non-contact power receiving appliance 201 is positioned above one power supply unit 1, and receives power of this power supply unit 1. Appliance ID 19 of adapter appliance 300 is initially registered as IDc in storage unit 6 of non-contact power supplying appliance 101. Power supply unit 1 that transmits power to non-contact power receiving appliance 201 is controlled by adapter appliance 300 communicating with non-contact power supplying appliance 101 in place of non-contact power receiving appliance 201.

Controller 2 of non-contact power supplying appliance 101 controls communication unit 5 to periodically send as a message a zero-cross point timing of a commercial power source obtained from zero-cross detector 23. Synchronously with a zero-cross point timing received by communication unit 26, controller 27 operates high-frequency power source unit 22.

Figure 28:
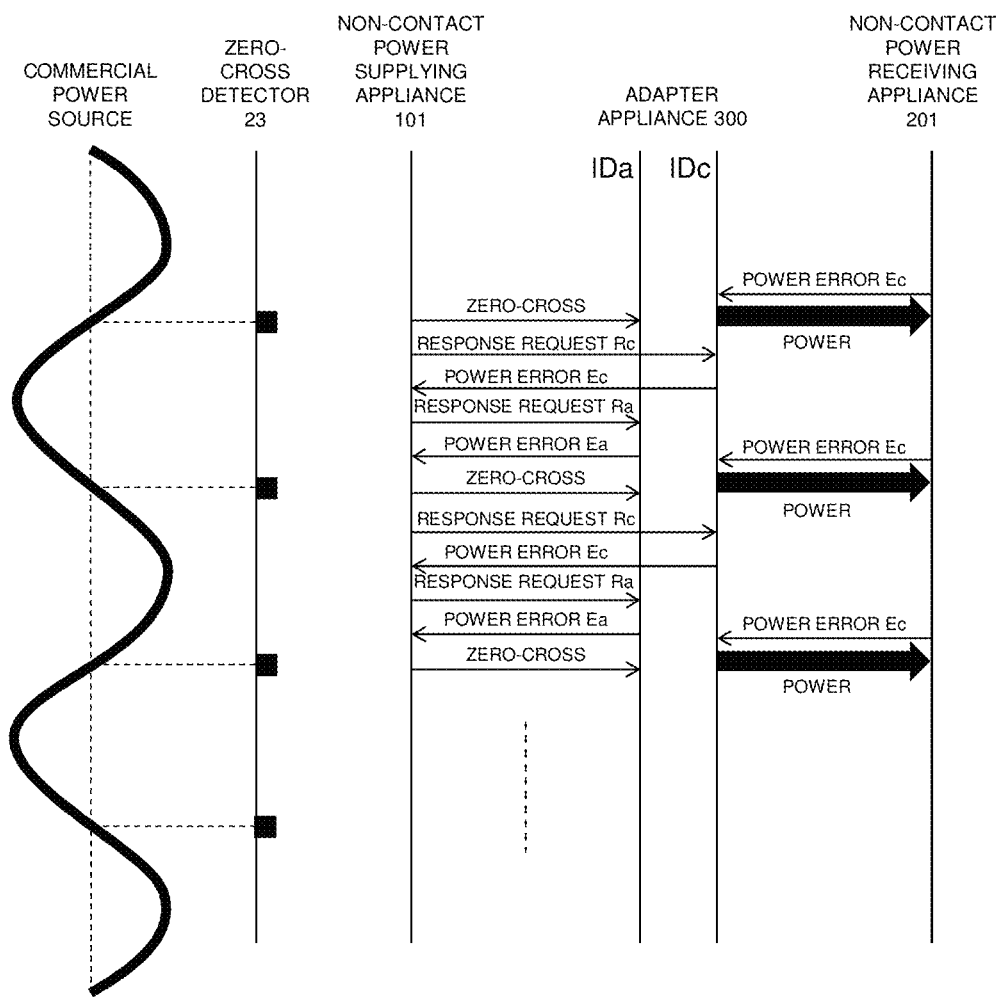
FIG. 28 is a diagram showing a communication sequence among a non-contact power supplying appliance, a non-contact power receiving appliance, and an adapter appliance according to the second exemplary embodiment.

FIG. 28 is a diagram showing a communication sequence among non-contact power supplying appliance 101, non-contact power receiving appliance 201, and adapter appliance 300.

As shown in FIG. 28, synchronously with a zero-cross point of a commercial power source, messages are sent-received between non-contact power supplying appliance 101 and adapter appliance 300, and between adapter appliance 300 and non-contact power receiving appliance 201.

Adapter appliance 300 has IDa and IDc, and by using IDa and IDc, communicates with non-contact power supplying appliance 101 and non-contact power receiving appliance 201. IDa is used to control power transmitted to adapter appliance 300. IDc is used to control power transmitted to non-contact power receiving appliance 201.

In FIG. 28, a thick arrow between IDc of adapter appliance 300 and non-contact power receiving appliance 201 expresses power transmitted from resonance circuit 25 of adapter appliance 300 to resonance circuit 21 of non-contact power receiving appliance 201, and a thin arrow expresses communication of information.

A term "zero-cross" means that a zero-cross point timing is sent as a message.

A term "response request" means a response-request message. A term "response request Ra" means a response-request message to IDa, that is, adapter appliance 300. A term "response request Rc" means a response-request message to IDc, that is, non-contact power receiving appliance 201.

A term "power error" means a power error sent as a message, in response to a response-request message. A term "power error Ea" means a power error concerning IDa, that is, adapter appliance 300c, and "power error Ec" means a power error concerning IDc, that is, non-contact power receiving appliance 201.

As described above, non-contact power supplying appliance 101 periodically sends a zero-cross point timing of a commercial power source as a message, to IDa of adapter appliance 300. Adapter appliance 300 operates high-frequency power source unit 22 synchronously with this timing.

Accordingly, power necessary for communication between adapter appliance 300 and non-contact power receiving appliance 201 is transmitted near a zero-cross point of power transmitted to resonance circuit 20. At this time, communication of a message (power error Ec) from non-contact power receiving appliance 201 is also carried out.

Adapter appliance 300 sends to IDa, power error information (power error Ea) concerning adapter appliance 300, in response to a response-request message (response request Ra) received from non-contact power supplying appliance 101. Non-contact power supplying appliance 101 controls power transmission to adapter appliance 300, in accordance with this error information.

Adapter appliance 300 sends to IDc, power error information (power error Ec) concerning non-contact power receiving appliance 201, in response to a response-request message (response request Rc) received from non-contact power supplying appliance 101. Non-contact power supplying appliance 101 controls power transmission to non-contact power receiving appliance 201 via adapter appliance 300, in accordance with this error information.

In this way, power is transmitted contactlessly, and communication of information not affected by the transmitted power is carried out.

As described above, according to the present exemplary embodiment, by providing adapter appliance 300, non-contact power receiving appliance 201 can be used above arbitrary power supply unit 1.

Further, in order to further simplify the configuration and control of adapter appliance 300, a primary cell may be used in place of power source circuit 9 and resonance circuit 24. By using a secondary cell in place of power source circuit 9, the power received may be accumulated in the secondary cell.

In order to identify a placement location of adapter appliance 300, resonance circuit 20 of non-contact power receiving appliance 201 may be used. Power supply unit 1 on which adapter appliance 300 is placed may be determined in advance.

Third Exemplary Embodiment

Hereinafter, a third exemplary embodiment of the present disclosure will be described with reference to FIG. 29 to FIG. 30D.

Figure 29:
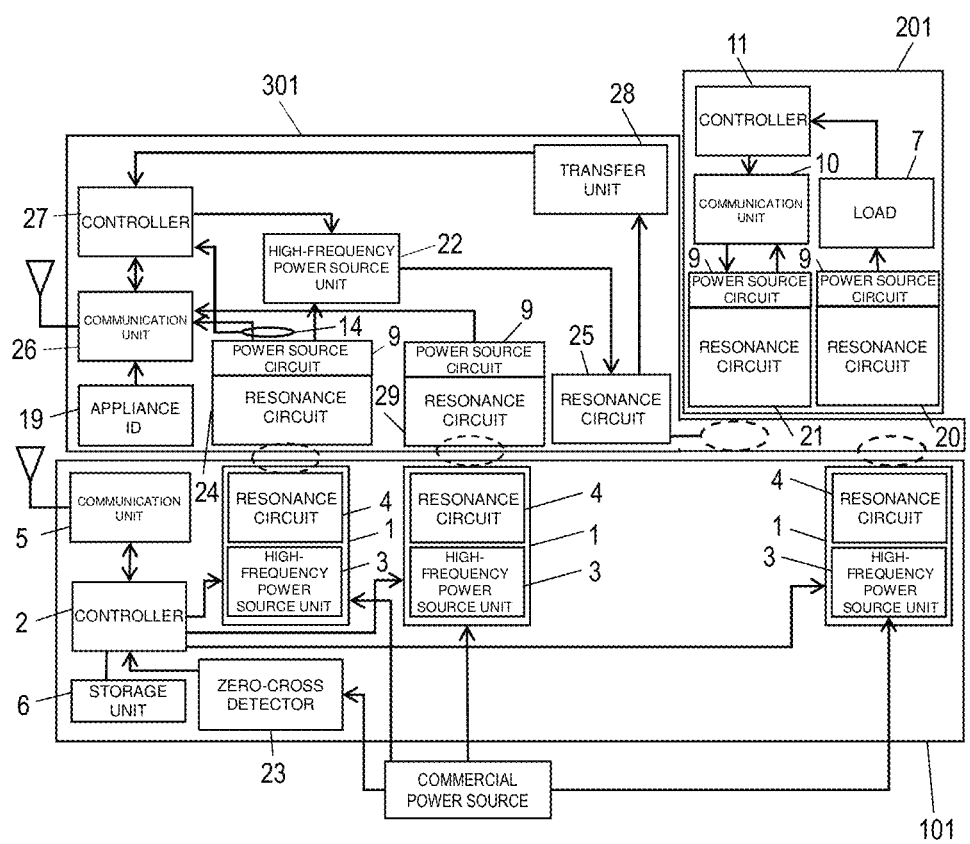
FIG. 29 is a block configuration diagram of a non-contact power supplying appliance, a non-contact power receiving appliance, and an adapter appliance according to a third exemplary embodiment.
Figure 30A:
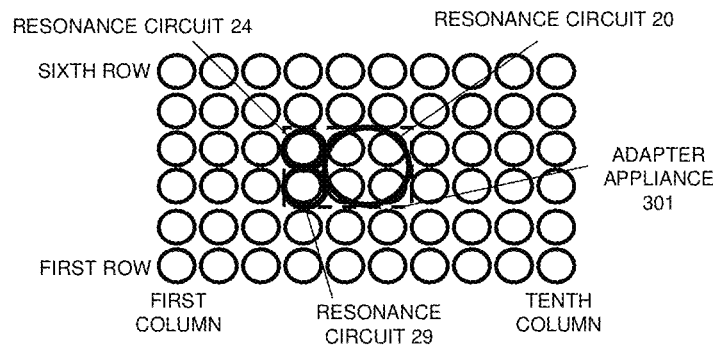
FIG. 30A is a plan view schematically showing a situation that an adapter appliance is placed on a non-contact power supplying appliance in a third exemplary embodiment.
Figure 30B:
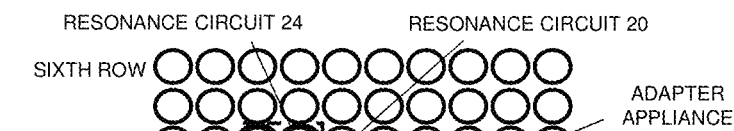
FIG. 30B is a plan view schematically showing a situation that an adapter appliance is placed on a non-contact power supplying appliance in the third exemplary embodiment.
Figure 30C:
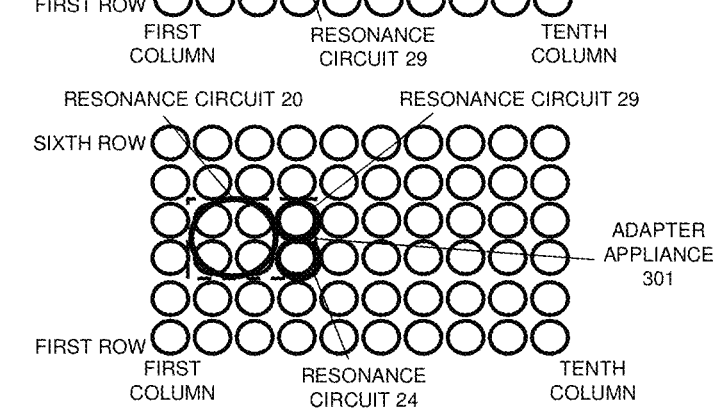
FIG. 30C is a plan view schematically showing a situation that an adapter appliance is placed on a non-contact power supplying appliance in the third exemplary embodiment.
Figure 30D:
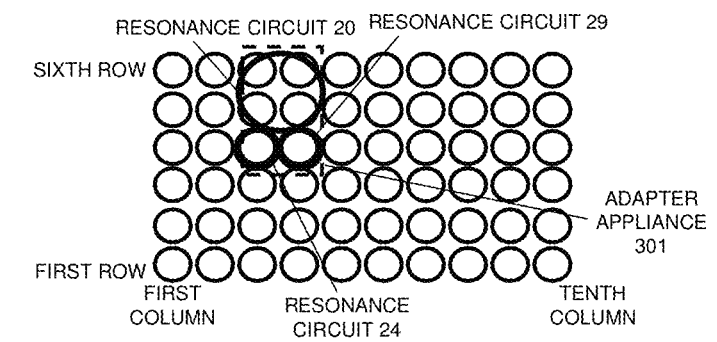
FIG. 30D is a plan view showing a state that an adapter appliance is placed on a non-contact power supplying appliance in the third exemplary embodiment.
Figure 31:
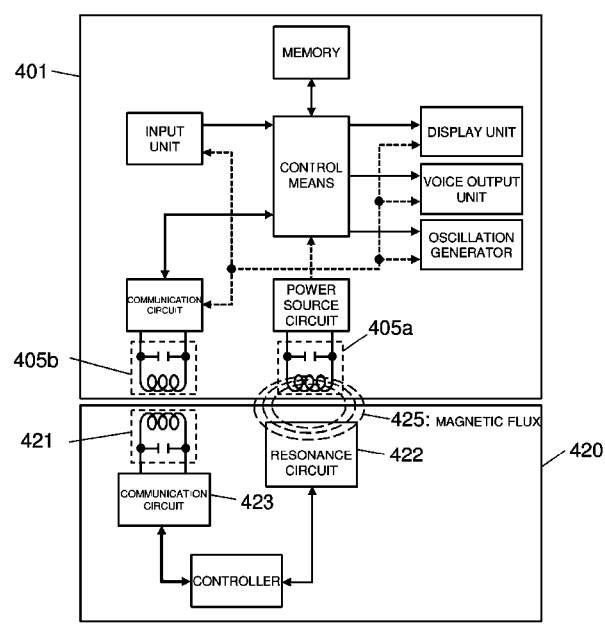
FIG. 31 is a block configuration diagram of a non-contact power supplying appliance and a non-contact power receiving appliance according to the conventional technique.
Figure 32:
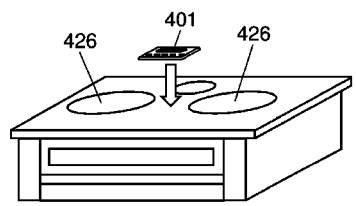
FIG. 32 is a diagram showing a concrete example of a non-contact power supplying appliance according to the conventional technique.
Figure 33:
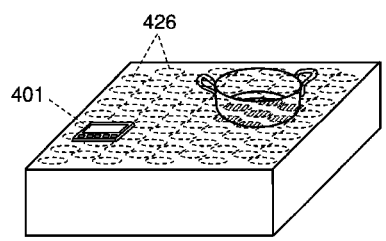
FIG. 33 is a diagram showing a concrete example of a non-contact power supplying appliance according to the conventional technique.
Figure 34:
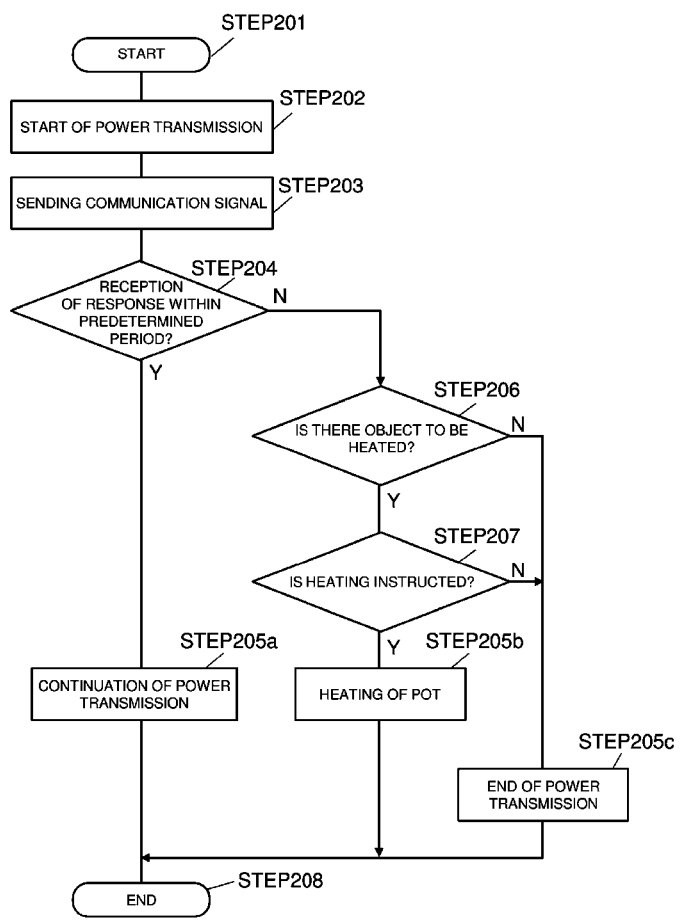
FIG. 34 is a flowchart showing control in a non-contact power supplying appliance according to the conventional technique.
Figure 35:
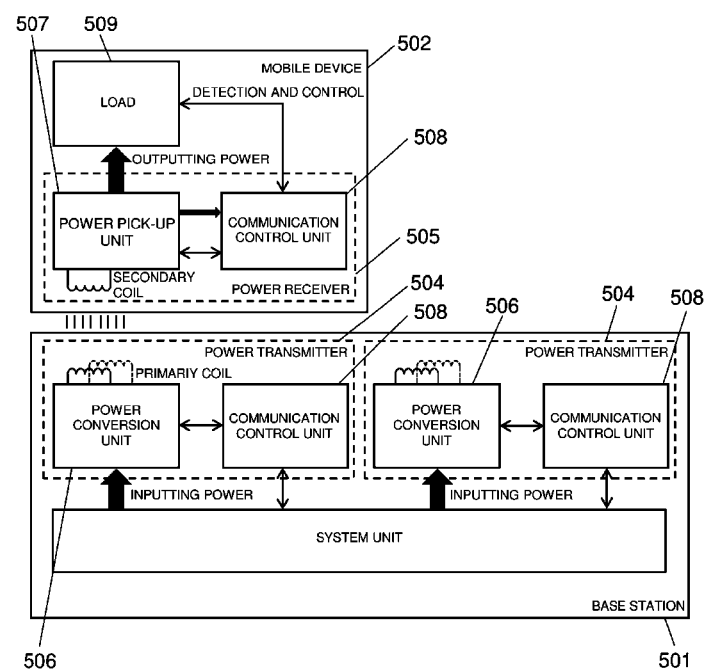
FIG. 35 is a block configuration diagram of a wireless charging system according to the conventional technique.
Figure 36:
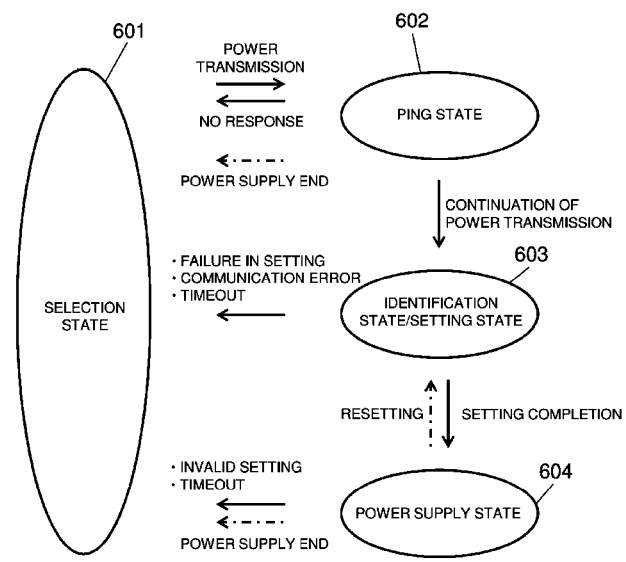
FIG. 36 is a state transition diagram of a wireless charging system according to the conventional technique.
Figures 37, 38:
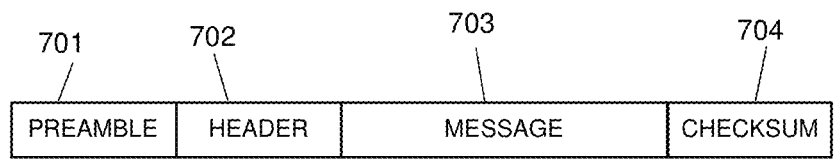
FIG. 37 is a diagram showing a communication frame format in the wireless charging system according to the conventional technique.
FIG. 38 is a diagram showing a relationship between a header and a message size of a communication frame form in the wireless charging system according to the conventional technique.

FIG. 29 is a block configuration diagram of non-contact power supplying appliance 101, non-contact power receiving appliance 201, and adapter appliance 301 according to the present exemplary embodiment. FIG. 30A to FIG. 30D are plan views schematically showing a state that adapter appliance 301 is placed on non-contact power supplying appliance 101.

In the second exemplary embodiment, power source circuit 9 of adapter appliance 300 is not connected to load 7, and supplies power to light loads of communication unit 26 and controller 27 of adapter appliance 301, and communication unit 10 and controller 11 of non-contact power receiving appliance 201. Therefore, a size of power source circuit 9 is set to correspond to one power supply unit 1.

In the case of the second exemplary embodiment, a placement location of resonance circuit 24 of adapter appliance 300 can be identified by the scan processing, but a placement location of resonance circuit 20 of non-contact power receiving appliance 201 cannot be identified by the scan processing.

Therefore, it is necessary to determine in advance that adapter appliance 300 must be set in a direction shown in FIG. 27, for example. According to the present exemplary embodiment, adapter appliance 301 can be used at an arbitrary position above non-contact power supplying appliance 101.

As shown in FIG. 29, in adapter appliance 301 according to the present exemplary embodiment, in addition to the configuration of adapter appliance 300, resonance circuit 29 as a fourth power receiving unit and power source circuit 9 connected to resonance circuit 29 are added, and IDb is added as appliance ID 19.

FIG. 30A to FIG. 30D are plan views schematically showing each situation that adapter appliance 301 is placed on non-contact power supplying appliance 101. As shown in FIG. 30A to FIG. 30D, when placement locations of resonance circuits 24, 29 are identified, a placement location of resonance circuit 20 can be identified.

Further, controllers 2, 11, 27 in the above exemplary embodiment are configured by microcomputers. Controllers 2, 11, 27 are not limited to microcomputers. However, when programmable microcomputers are used, a processing content can be easily changed, and degrees of freedom of design can be enhanced.

In order to improve a processing speed, controllers 2, 11, 27 can be also configured by logic circuits. Controllers 2, 11, 27 may be physically configured by one or a plurality of elements. In the case of configuring controllers 2, 11, 27 by a plurality of elements, each control element may be implemented by separate elements. In this case, these plurality of elements can be considered to correspond to one controller.

INDUSTRIAL APPLICABILITY

The present disclosure is useful for a non-contact power transmitting system in which a non-contact power supplying appliance is an induction heating cooker having a plurality of power supply units arranged in a matrix shape.

REFERENCE MARKS IN THE DRAWINGS

1: power supply unit
2, 11, 27: controller
3, 22: high-frequency power source unit
4: resonance circuit
5, 10, 26: communication unit
6: storage unit
7, 509: load
8, 20, 21, 24, 25, 29, 405a, 405b, 421, 422: resonance circuit 9: power source circuit
12: power measuring unit
13: format
13a, 701: preamble
13b: sender address
13c: destination address
13d, 702: header
13e, 703: message
13f, 704: checksum
14: initial registration state
15: placement detection state
16: scan processing state
17: registration state
18, 604: power supply state
19: appliance id
23: zero-cross detector
28: transfer unit
100, 101: non-contact power supplying appliance
200, 200a, 200b, 200c, 201: non-contact power receiving appliance
300, 301: adapter appliance

The invention claimed is:

1. A non-contact power supplying appliance that contactlessly transmits power to a non-contact power receiving appliance having a load, the non-contact power supplying appliance comprising:
a plurality of power supply units that transmit the power;
a power-supply side communication unit that sends and receives a communication packet; and
a power-supply side controller that controls the power supply units and the power-supply side communication unit,
wherein the power-supply side communication unit completes placement detection of the non-contact power receiving appliance when the power-supply side communication unit sends a first response-request message for placement detection of the non-contact power receiving appliance, and thereafter receives a corresponding first response message including a magnitude of the power under reception by the non-contact power receiving appliance,
the power-supply side controller identifies a combination of the non-contact power receiving appliance and some of the power supply units when the power-supply side communication unit sends second and third response-request messages for identifying a placement location of the non-contact power receiving appliance and thereafter respectively receives corresponding second and third response messages including the magnitude of the power under reception by the non-contact power receiving appliance, and
the power-supply side controller is configured to control the some of the power supply units in accordance with a corresponding fourth response message that is received by the power-supply side communication unit and includes a difference between the magnitude of the power under reception by the non-contact power receiving appliance and rated power of the load after the power-supply side communication unit sends a fourth response-request message for power control.

2. The non-contact power supplying appliance according to claim 1, further comprising a storage unit that is controlled by the power-supply side controller and stores information communicated via the power-supply side communication unit,
wherein
the power supply units are arranged in a matrix shape, and in order to identify a combination of the non-contact power receiving appliance and the some of the power supply units, the power-supply side controller is configured to execute, by controlling the power supply units, the power-supply side communication unit, and the storage unit, (A) a process of carrying out power transmission by the power supply units of at least one row, and sending the second response-request message to the non-contact power receiving appliance of which the placement detection is completed, (B) a process, after receiving the second response message corresponding to the second response-request message, of storing a communication address of the non-contact power receiving appliance and the magnitude of the power under reception by the non-contact power receiving appliance included in the second response message, (C) a process of executing process (A) and process (B) to all rows, and identifying a row in which a magnitude of power under reception becomes largest, (D) a process of carrying out power transmission by the power supply units of at least one column, and sending the third response-request message to the non-contact power receiving appliance of which the placement detection is completed, (E) a process, after receiving the third response message corresponding to the third response-request message, of storing a communication address of the non-contact power receiving appliance and the magnitude of the power under reception by the non-contact power receiving appliance included in the third response message, and (F) a process of executing process (D) and process (E) to all columns, and identifying a column in which the magnitude of the power under reception becomes largest.

3. The non-contact power supplying appliance according to claim 2, wherein the power-supply side controller is configured to exclude the non-contact power receiving appliance to which power is being supplied, from power transmission targets, when the power-supply side communication unit does not receive the fourth response message during a predetermined period from the non-contact power receiving appliance that is receiving power after the power-supply side communication unit sends the fourth response-request message to the non-contact power receiving appliance that is receiving power.

4. The non-contact power supplying appliance according to claim 3, wherein the power-supply side controller is configured to execute placement detection after excluding the non-contact power receiving appliance that is receiving power, from the power transmission targets.

5. The non-contact power supplying appliance according to claim 4, wherein the power-supply side controller is configured to register the non-contact power receiving appliance excluded from the power transmission targets, as one of the power transmission targets again, when the non-contact power receiving appliance is placed again.

6. A non-contact power receiving appliance that receives power contactlessly transmitted from a non-contact power supplying appliance, the non-contact power receiving appliance comprising:
a power receiving unit that receives the power;
a power-receiving side communication unit that sends and receives a communication packet;

a power measuring unit that measures the power under reception by the power receiving unit; and
a load,
wherein
upon receiving a first response-request message for placement detection of the non-contact power receiving appliance, the power-receiving side communication unit sends a corresponding first response message including a magnitude of the power measured by the power measuring unit,
upon receiving second and third response-request messages for identifying a placement location of the non-contact power receiving appliance, the power-receiving side communication unit respectively sends corresponding second and third response messages including the magnitude of the power measured by the power measuring unit, and
upon receiving a fourth response-request message for controlling the power transmitted, the power-receiving side communication unit sends a difference between the magnitude of the power measured by the power measuring unit and rated power of the load, as a fourth response message.

7. The non-contact power receiving appliance according to claim 6, further comprising:
a switching unit that is closed when the non-contact power receiving appliance is placed, and is opened when the power transmitted from the non-contact power supplying appliance is supplied to the load and the non-contact power receiving appliance is lifted, and stops the supply of the power to the load,
wherein
the power-receiving side communication unit is configured to send a response message indicating moving of the non-contact power receiving appliance, when the switching unit is opened.

8. A non-contact power transmitting system comprising:
a non-contact power supplying appliance that contactlessly transmits power to a non-contact power receiving appliance having a load; and
a non-contact power receiving appliance that receives power contactlessly transmitted from a non-contact power supplying appliance,
wherein
the non-contact power supplying appliance has a plurality of power supply units that transmit the power, a power-supply side communication unit that sends and receives a communication packet, and a power-supply side controller that controls the power supply units and the power-supply side communication unit,
wherein the power-supply side communication unit completes placement detection of the non-contact power receiving appliance when the power-supply side communication unit sends a first response-request message for placement detection of the non-contact power receiving appliance, and thereafter receives a corresponding first response message including a magnitude of the power under reception by the non-contact power receiving appliance,
the power-supply side controller identifies a combination of the non-contact power receiving appliance and some of the power supply units when the power-supply side communication unit sends second and third response-request messages for identifying a placement location of the non-contact power receiving appliance and thereafter respectively receives corresponding second and third response messages including the magnitude of the power under reception by the non-contact power receiving appliance, and
the power-supply side controller is configured to control the some of the power supply units in accordance with a corresponding fourth response message received by the power-supply side communication unit and includes a difference between the magnitude of the power under reception by the non-contact power receiving appliance and rated power of the load after the power-supply side communication unit sends a fourth response-request message for power control,
and wherein
the non-contact power receiving appliance has a power receiving unit that receives the power, a power-receiving side communication unit that sends and receives a communication packet, a power measuring unit that measures the power under reception by the power receiving unit, and a load,
wherein
upon receiving a first response-request message for placement detection of the non-contact power receiving appliance, the power-receiving side communication unit sends a corresponding first response message including a magnitude of the power measured by the power measuring unit,
upon receiving second and third response-request messages for identifying a placement location of the non-contact power receiving appliance, the power-receiving side communication unit respectively sends corresponding second and third response messages including the magnitude of the power measured by the power measuring unit, and
upon receiving a fourth response-request message for controlling the power transmitted, the power-receiving side communication unit sends a difference between the magnitude of the power measured by the power measuring unit and rated power of the load, as a fourth response message.

9. The non-contact power transmitting system according to claim 8, further comprising an adapter appliance that receives the power from the non-contact power supplying appliance and transmits the power to the non-contact power receiving appliance, and sends and receives the communication packet between the non-contact power supplying appliance and the non-contact power receiving appliance, wherein
the power-receiving side communication unit is a power-receiving communication unit that receives the power which is load-modulated to send and receive the communication packet,
the non-contact power supplying appliance further comprises a zero-cross detector that detects a zero-cross point of a commercial power source, and the power-supply side communication unit is configured to send a timing of the zero-cross point to the adapter appliance,
the adapter appliance includes a power-supply communication unit that contactlessly transmits power to the power-receiving communication unit and sends and receives the communication packet to and from the power-receiving communication unit, and an adapter-side communication unit that communicates with the power-supply side communication unit,
the power-supply side communication unit sends the zero-cross point timing to the adapter-side communication unit, and the power-supply communication unit transmits the power and sends and receives the communication packet in accordance with the zero-cross point, and the power-supply side controller is configured to control, for power control, the power supply units in accordance with the communication packet received by the power-supply side communication unit.

10. The non-contact power transmitting system according to claim 9, wherein the adapter appliance further has an adapter-side power receiving unit that receives the power contactlessly transmitted from the non-contact power supplying appliance, the power-supply side controller is configured to identify a combination of the adapter-side power receiving unit and some of the power supply units, in order to identify a placement location of the non-contact power receiving appliance.

* * * * *